(12) United States Patent
Takada

(10) Patent No.: US 7,927,086 B2
(45) Date of Patent: Apr. 19, 2011

(54) MANUFACTURING APPARATUS FOR USE WITH A MEMBRANE ELECTRODE ASSEMBLY AND METHOD FOR MANUFACTURING SAME

(75) Inventor: Kazuyoshi Takada, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 304 days.

(21) Appl. No.: 12/047,729

(22) Filed: Mar. 13, 2008

(65) Prior Publication Data

US 2008/0230936 A1  Sep. 25, 2008

(30) Foreign Application Priority Data

Mar. 19, 2007 (JP) .................................. 2007-070874
Nov. 26, 2007 (JP) .................................. 2007-304692

(51) Int. Cl.
*B29C 45/76* (2006.01)
*B29C 45/26* (2006.01)
*B29C 70/76* (2006.01)

(52) U.S. Cl. ..... 425/116; 425/127; 425/128; 425/129.1; 425/547; 264/40.5

(58) Field of Classification Search .......................... None
See application file for complete search history.

(56) References Cited

U.S. PATENT DOCUMENTS

| | | | | |
|---|---|---|---|---|
| 4,584,155 A | * | 4/1986 | Zanella | 264/252 |
| 4,626,185 A | * | 12/1986 | Monnet | 425/110 |
| 5,061,429 A | * | 10/1991 | Yoshihara et al. | 264/252 |
| 5,798,070 A | * | 8/1998 | Sakai et al. | 264/272.17 |
| 6,667,124 B2 | | 12/2003 | Suenaga et al. | |
| 6,720,103 B1 | | 4/2004 | Nagai | |
| 2002/0034670 A1 | | 3/2002 | Suenaga et al. | |
| 2005/0255372 A1 | | 11/2005 | Lertola | |

FOREIGN PATENT DOCUMENTS

EP  1 624 515 A1  2/2006

* cited by examiner

*Primary Examiner* — Edmund H. Lee
(74) *Attorney, Agent, or Firm* — Young Basile

(57) ABSTRACT

Disclosed herein is a membrane electrode assembly with a superior power generating efficiency and a method of manufacturing the same. Also disclosed is a manufacturing apparatus thereof wherein a gasket with an optimum thickness can be easily applied to the membrane electrode assembly without preparing various types of gaskets. A method of manufacturing the membrane electrode assembly with catalytic layers and gas diffusion layers on surfaces of the electrolyte membrane comprises controlling a molding thickness according to thicknesses of the catalytic layers and the gas diffusion layers and integrally molding the gasket portions formed with resin materials on at least one surface of the electrolyte membrane.

20 Claims, 20 Drawing Sheets

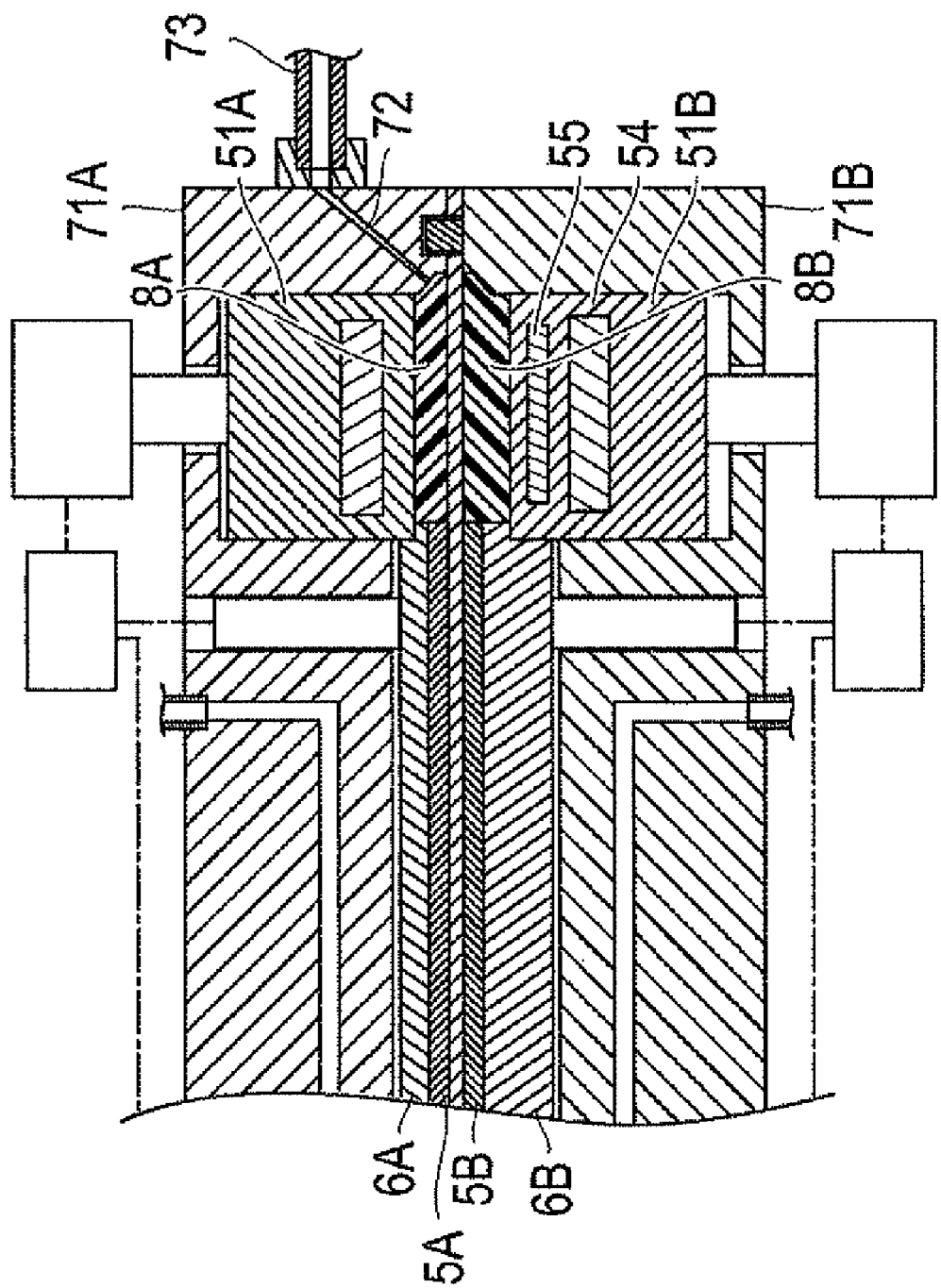

MANUFACTURING APPARATUS FOR USE WITH A MEMBRANE ELECTRODE ASSEMBLY AND METHOD FOR MANUFACTURING SAME

CROSS REFERENCE RELATED TO APPLICATIONS

This application claims priority to Japanese Patent Application Serial No. 2007-070874, filed Mar. 19, 2007 and Japanese Patent Application Serial No. 2007-304692, filed Nov. 26, 2007, each of which is incorporated herein in its entirety by reference.

TECHNICAL FIELD

The invention relates to a membrane electrode assembly and a method of manufacturing the same. The invention also relates to a manufacturing apparatus thereof.

BACKGROUND

Generally, a fuel cell is formed by stacking a membrane electrode assembly that forms a catalytic layer and a gas diffusion layer on each of the surfaces of an electrolyte membrane and interposing a separator therebetween. WO 01/017048 discloses an electrolyte membrane exposed to the catalytic layer. The gas diffusion layer is not formed at an outer peripheral portion of the membrane electrode assembly. Further, a gasket formed with a resin material for providing sealing between the outer peripheral portion and the separator is applied thereto. An optimum thickness of such a gasket is determined based on a thickness of the gas diffusion layer. Thus, when there is a change in size of the gas diffusion layer, it is necessary to prepare various types of gaskets with different thicknesses to accommodate the changing thickness of the gas diffusion layer. However, gaskets of varying thicknesses are limited, and it is possible that a gasket having the optimum thickness for a gas diffusion layer cannot be used. For example, when the gasket is not thick enough, the gas diffusing performance and the drainage performance deteriorate since the gas diffusion layer is excessively pressed and crushed. Alternatively, when the gasket is too thick, the power generating efficiency deteriorates since the electrical resistance of the gas diffusion layer increases.

BRIEF SUMMARY

Disclosed herein are methods of manufacturing a membrane electrode assembly wherein the membrane electrode assembly has both a catalytic layer and a gas diffusion layer on opposing surfaces of an electrolyte membrane. One such method comprises measuring thicknesses of the catalytic layer and the gas diffusion layer, determining a thickness of a gasket portion according to the thicknesses of the catalytic layer and the gas diffusion layer and molding the gasket portion having the determined thickness around the catalytic layer and the gas diffusion layer on the electrolyte membrane.

Also disclosed are embodiments of a manufacturing apparatus to be used with a membrane electrode assembly. One embodiment of the manufacturing apparatus comprises a mold cast including a gripping portion configured to grip an edge portion of the catalytic and the gas diffusion layers, a measuring portion configured to measure thicknesses of the catalytic layer and the gas diffusion layer, a moveable block operable to move forward and backward against the electrolyte membrane along an inner side surface of the gripping portion, the moveable block having a side opposite the gripping portion and adjacent to an outer peripheral end of the gas diffusion layer, and a control portion configured to control the forward-backward movement of the moveable block according to the thicknesses of the catalytic layer and the gas diffusion layer.

BRIEF DESCRIPTION OF THE DRAWINGS

The description herein makes reference to the accompanying drawings wherein like reference numerals refer to like parts throughout the several views, and wherein:

FIG. 20 is a partial cross-sectional view when the compression-molding and the injection molding are completed after the mold cast of the manufacturing apparatus is mold-clamped.

DETAILED DESCRIPTION OF EMBODIMENTS OF THE INVENTION

Figure 1:
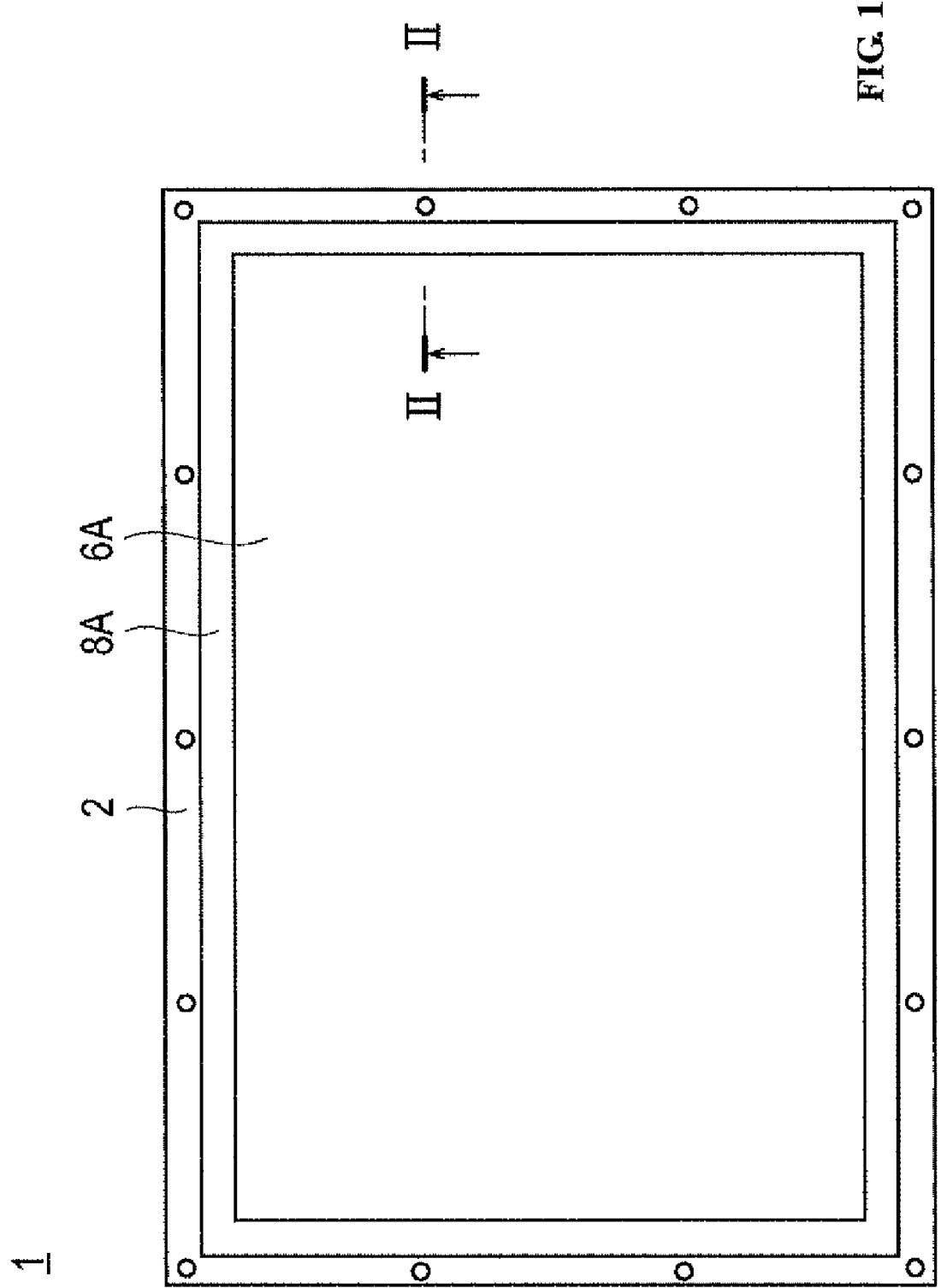
FIG. 1 is a top view of a membrane electrode assembly in accordance with a first embodiment.
Figure 2:
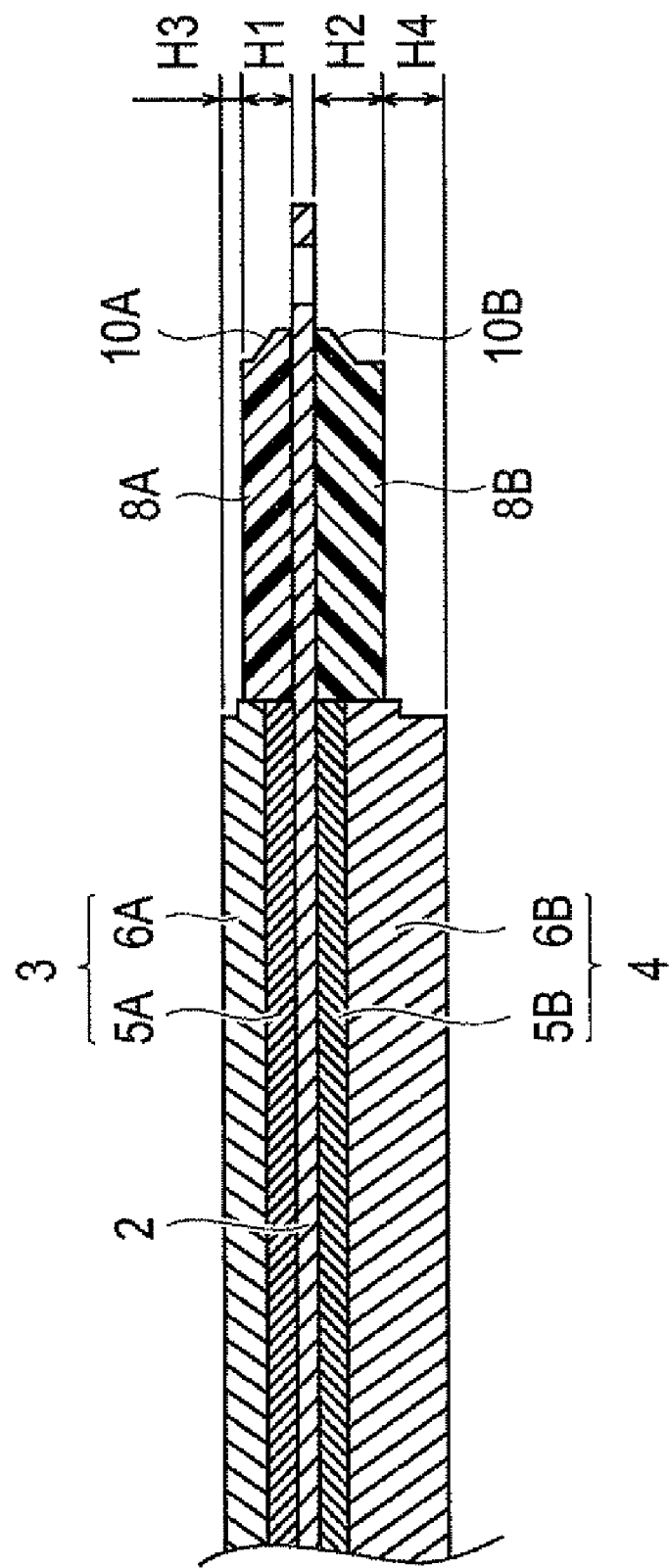
FIG. 2 is a partial cross-sectional view taken along the line II-II of FIG. 1.

As shown in FIGS. 1 and 2, a membrane electrode assembly 1 in accordance with a first embodiment has a stacking structure wherein a solid polymer electrolyte membrane 2 is inserted between an anode 3 and a cathode 4. The solid polymer electrolyte membrane 2 may include a perfluorocarbon polymer membrane having a sulfonic acid base. An example of this is Nafion 1128®. The anode 3 comprises a first catalytic layer 5A and a first gas diffusion layer 6A, while the cathode 4 comprises a second catalytic layer 5B and a second gas diffusion layer 6B. At the edges of the membrane electrode assembly 1, a first gasket portion 8A and a second gasket portion 8B formed with resin materials are integrally installed on each side of the electrolyte membrane 2 and around the edges of the catalytic layers 5A and 5B and the gas diffusion layers 6A and 6B. Thicknesses H1 and H2 of the first and second gasket portions 8A and 8B, respectively, are formed such that the surfaces of gasket portions 8A and 8B opposite the electrolyte membrane 2 do not extend as high as the surfaces of the first and second gas diffusion layers 6A and 6B. The first and second gas diffusion layers 6A and 6B extend higher than the first and second gasket portions 8A and 8B by step heights H3 and H4, respectively. Outer peripheral edge portions of the gasket portions 8A and 8B are inclined to form inclined surfaces 10A and 10B.

The resin materials used for the gasket portions 8A and 8B may include PEN (polyethylene naphthalate), PET (polyethylene terephthalate), PBT (polybutylene terephthalate), PA (polyamide), PP (polypropylene), POM (polyacetal), PC (polycarbonate), PE (polyethylene), PS (polystyrene), ABS (acrylonitrile butadiene styrene), PMMA (acryl), PPS (polyphenylene sulfide), epoxy, phenol, unsaturated polyester and thermoplastic elastomer as non-limiting examples.

Figure 3:
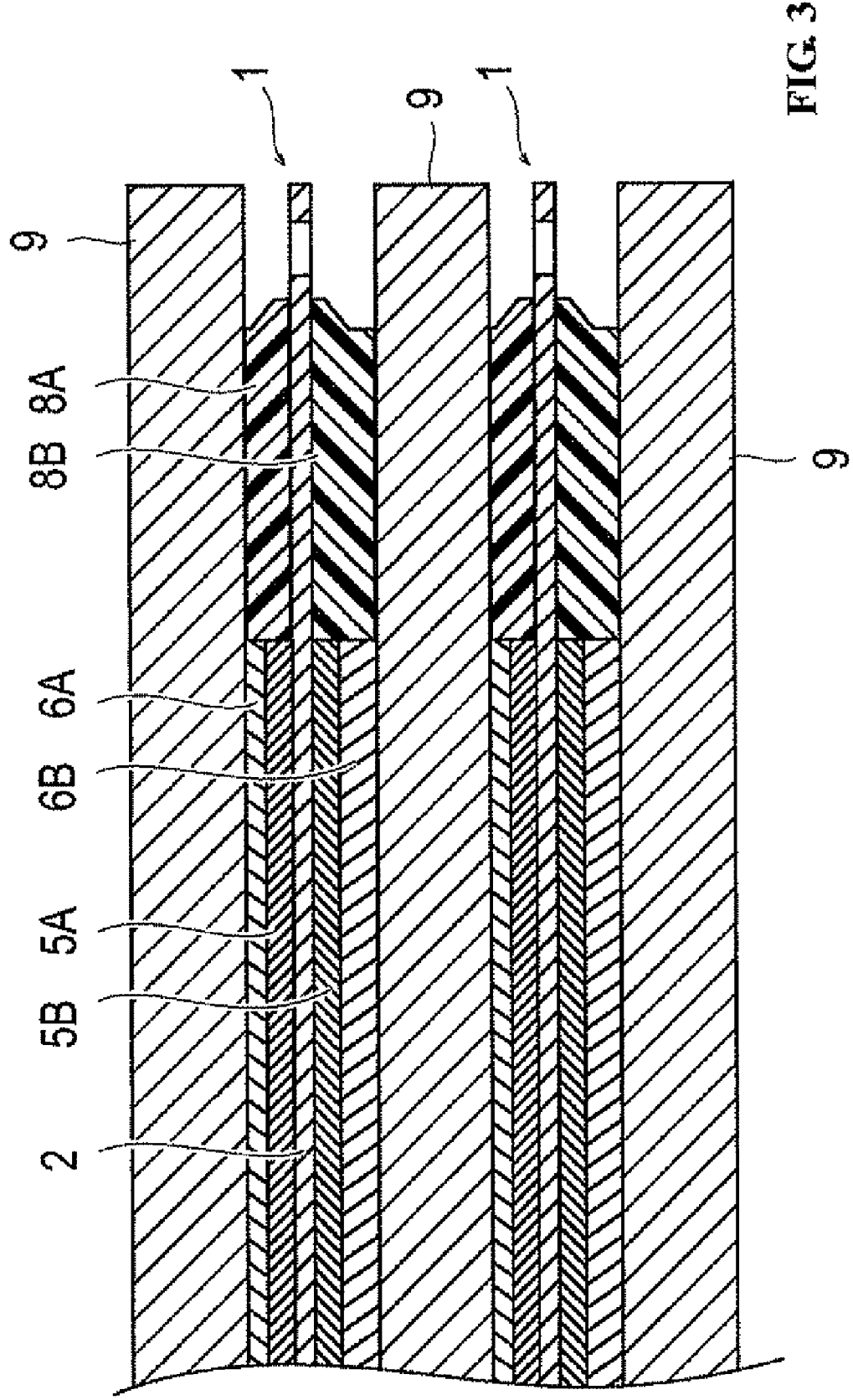
FIG. 3 is a partial cross-sectional view of a fuel cell.

As shown in FIG. 3, the membrane electrode assembly 1 overlaps with a separator 9 when constituting a fuel cell. At this time, the gasket portions 8A and 8b are adhered to the separator 9, thereby functioning to prevent leakage of fuel gas or coolant. Since the gas diffusion layers 6A and 6B are formed higher than the gasket portions 8A and 8B, they are compressed until their surfaces are planar with the surfaces of the gasket portions 8A and 8B. If the gas diffusion layers 6A and 6B are excessively pressed and crushed, then the gas diffusing performance and the drainage performance deteriorate. Further, if the gas diffusion layers 6A and 6B are not compressed enough, then the electrical resistance increases. Thus, it is desirable that the thicknesses H1 and H2 of the gasket portions 8A and 8B are manufactured to optimize the gas diffusing performance, the drainage performance and the electrical resistance. In the present embodiment, the thicknesses H1 and H2 of the gasket portions 8A and 8B are established such that the step heights H3 and H4 become, for example, predetermined values within a range of 30 to 200 μm. However, the invention is not specifically limited to values within such a range.

Figure 4:
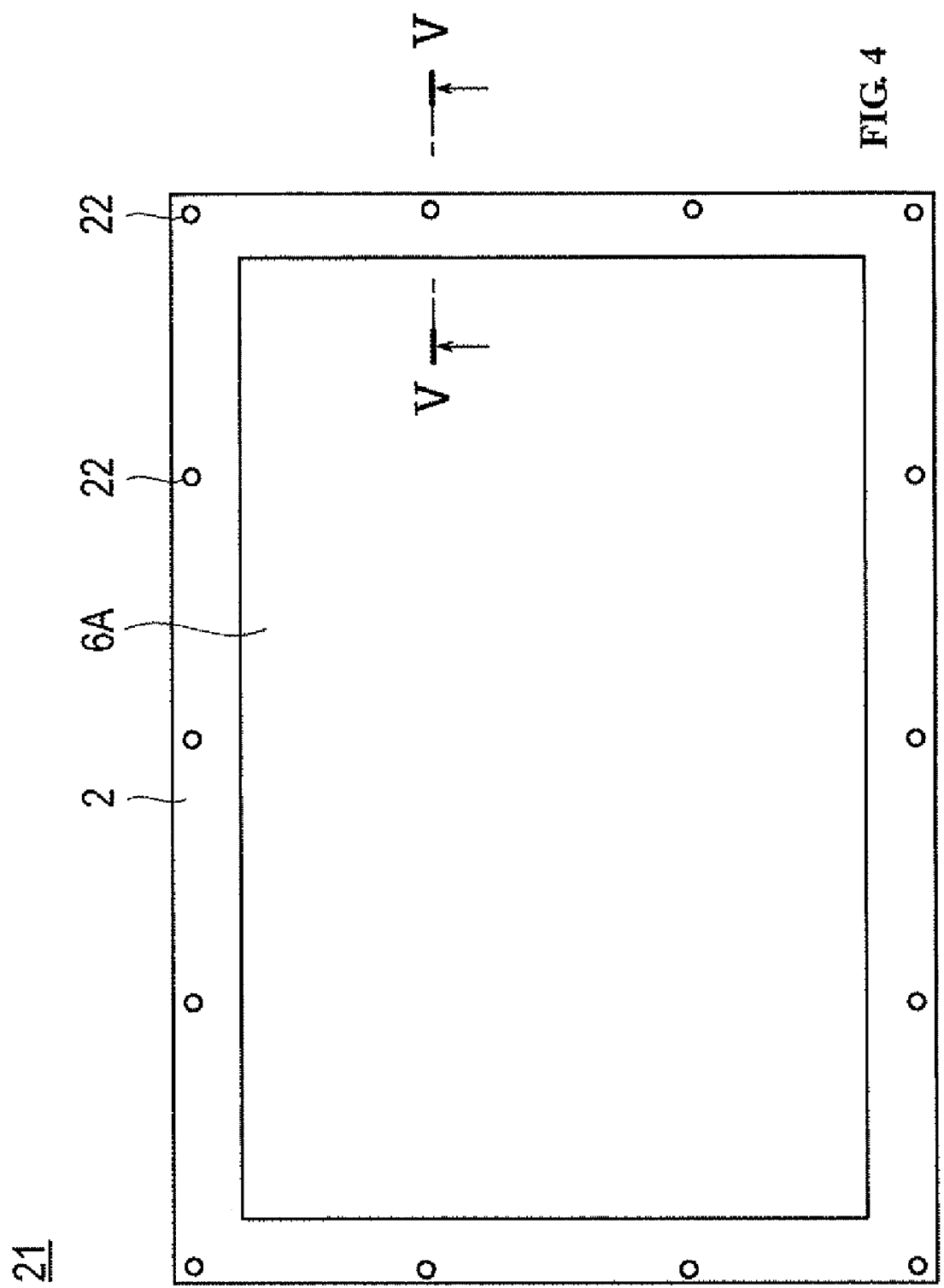
FIG. 4 is a top view of a pre-assembly before a gasket portion is molded.
Figure 5:
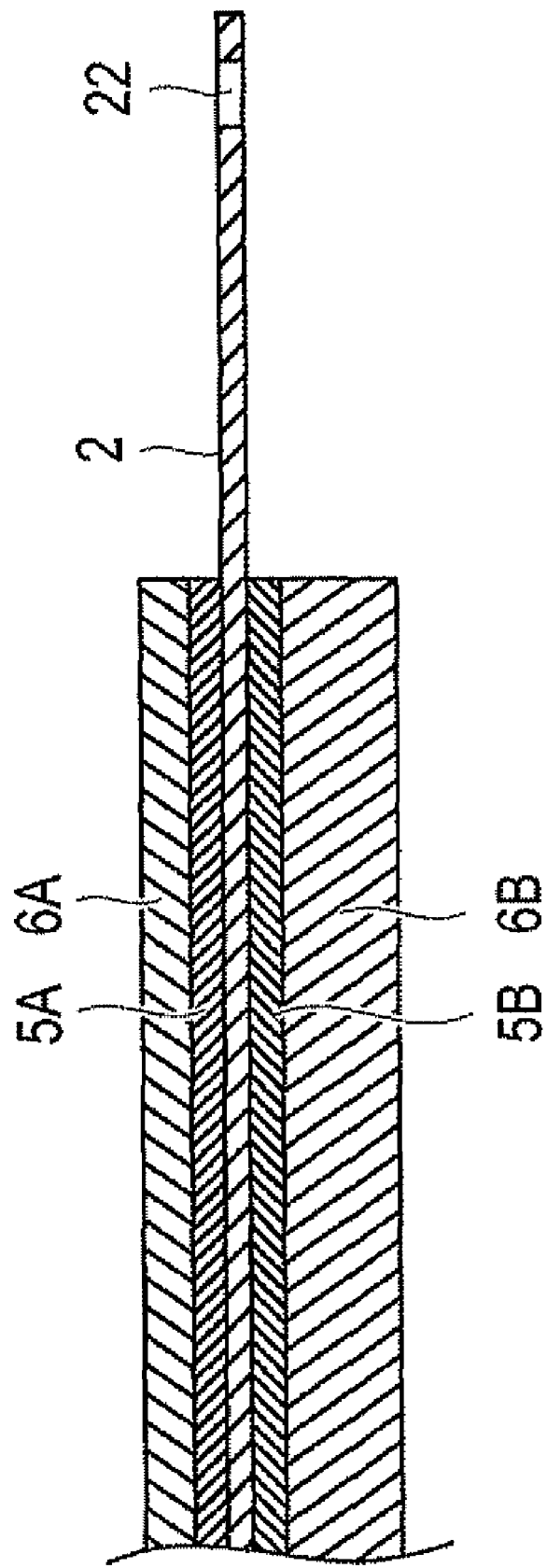
FIG. 5 is a partial cross-sectional view taken along the line V-V of FIG. 4.
Figure 6:
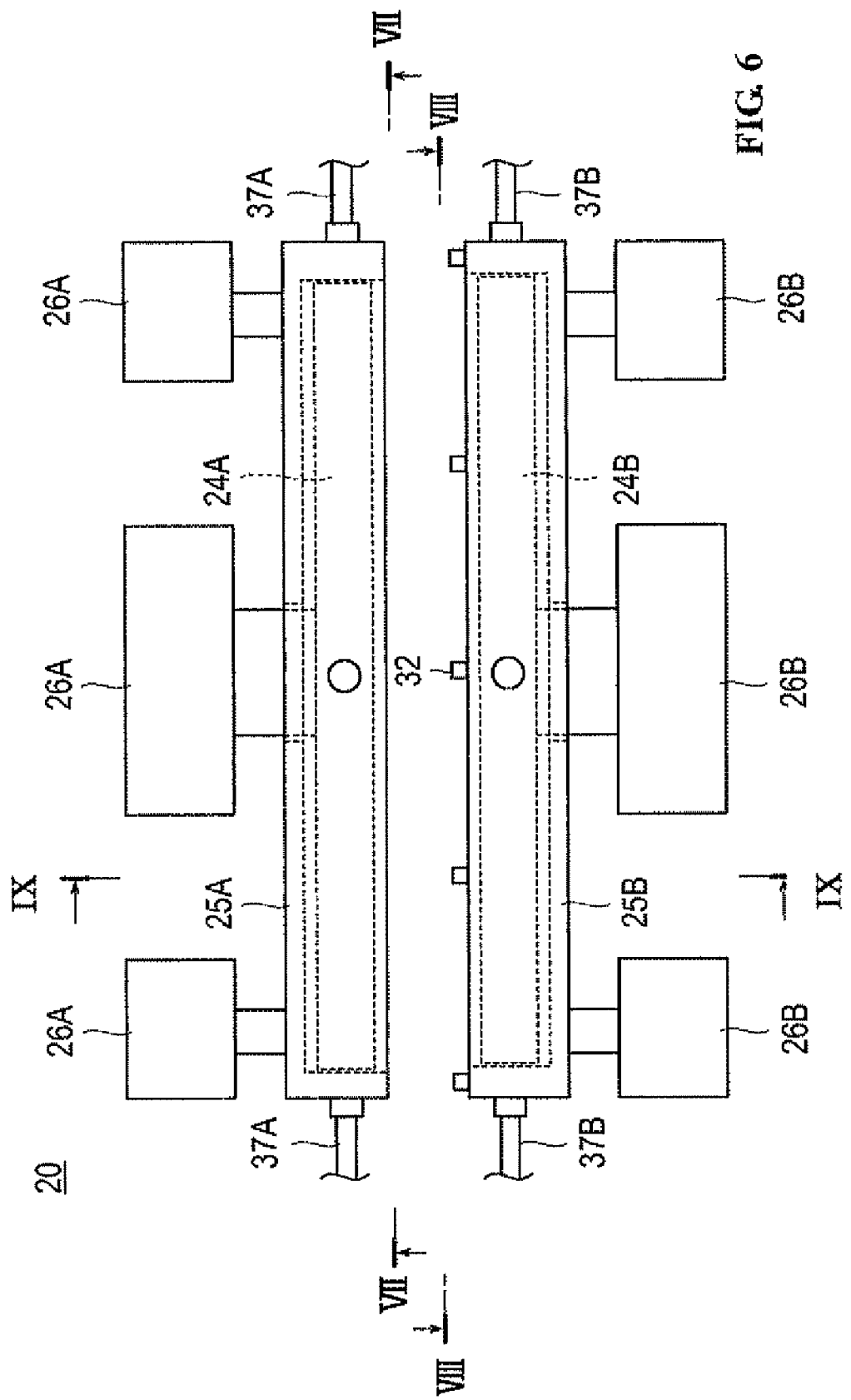
FIG. 6 is a side view of a manufacturing apparatus of a membrane electrode assembly in accordance with the first embodiment.

The manufacturing apparatus of the membrane electrode assembly in accordance with the first embodiment comprises an apparatus for installing a pre-assembly 21 as illustrated in FIGS. 4 and 5, which forms the catalytic layers 5A and 5B and the gas diffusion layers 6A and 6B on both surfaces of the electrolyte membrane 2. The apparatus also integrally injection-molds or injection thermal compression-molds the gasket portions 8A and 8B by injecting the resin materials to the electrolyte membrane 2. The pre-assembly 21 has a plurality of through-holes 22 along the edge portion of the electrolyte membrane 2.

As shown in FIGS. 6 to 9, the manufacturing apparatus 20 of the membrane electrode assembly comprises a pair of first and second mold casts 25A and 25B, respectively including a first moveable block 24A and a second moveable block 24B therein. The manufacturing apparatus 20 further comprises a pressing device (not shown) for pressing the first and second mold casts 25A and 25B, a first driving portion 26A and a second driving portion 26B for driving the first and second moveable blocks 24A and 24B, a first control portion 28A and a second control portion 28B (shown in FIG. 9) for controlling the first and second driving portions 26A and 26B, a first measuring portion 29A for measuring a total thickness of the first catalytic layer 5A and the first gas diffusion layer 6A, and a second measuring portion 29B for measuring a total thickness of the second catalytic layer 5B and the second gas diffusion layer 6B. The first and second measuring portions 29A and 29B are arranged on the first and second mold casts 25A and 25B, respectively.

Figure 9:
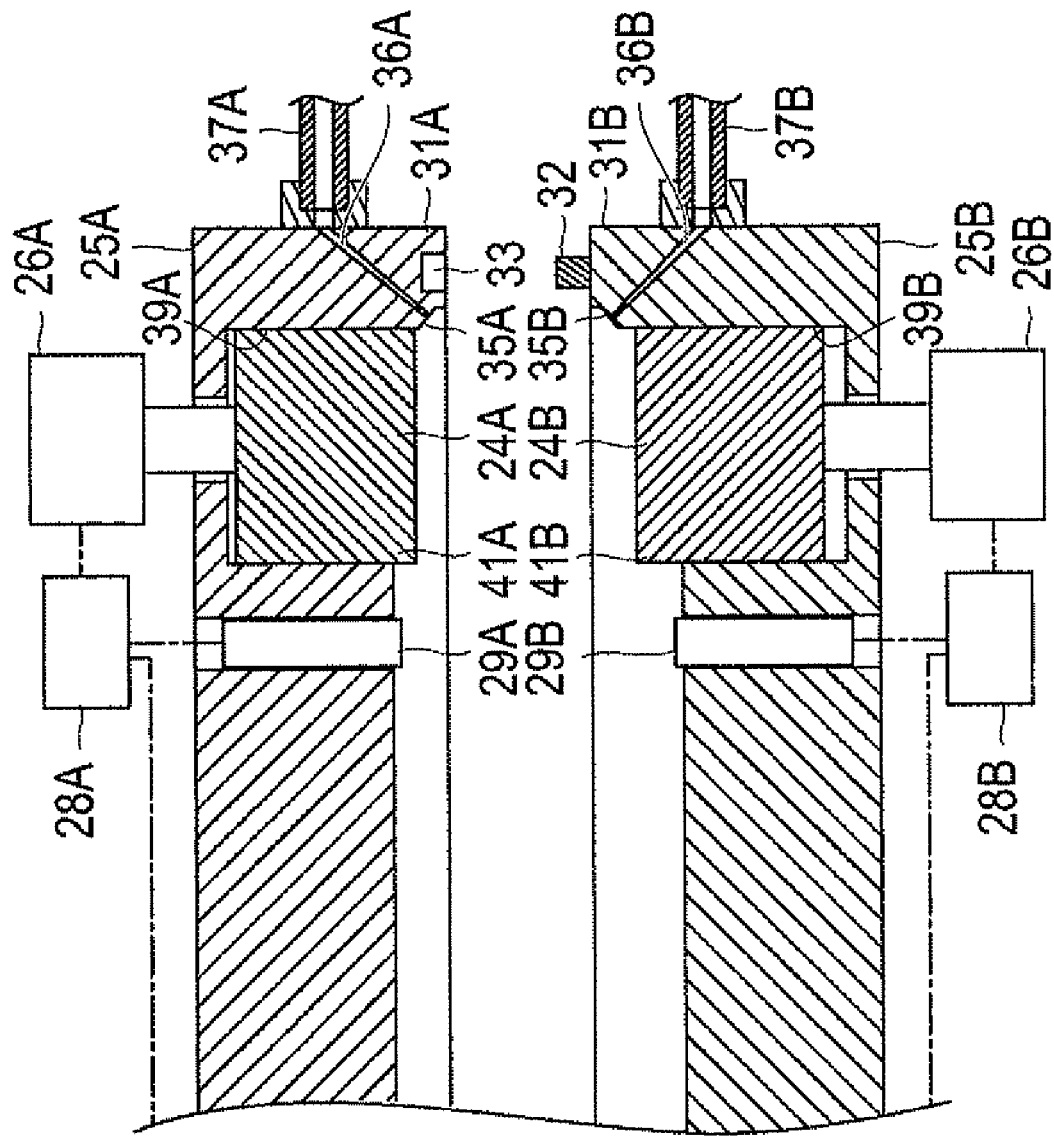
FIG. 9 is a partial cross-sectional view taken along the line IX-IX of FIG. 6.

Referring to FIG. 9, the first mold cast 25A and the second mold cast 25B can be relatively closely spaced by the pressing device. A first gripping portion 31A and a second gripping portion 31B for inserting and gripping the edge portion of the electrolyte membrane 2 are formed on outer peripheries of each opposite surface of the first and second mold casts 25A, 25B. A plurality of projections 32 are formed on a surface of the second gripping portion 31B opposite to the first gripping portion 31A in a circumferential direction, while a fitting portion 33 is formed on a surface of the first gripping portion 31A opposite to the second gripping portion 31B. The projections 32 are matingly received by the fitting portions 33. Since inner side corner portions of the first and second gripping portions 31A and 31B are inclined against a surface of fitting and supporting the electrolyte membrane 2, gripping portion inclined surfaces 35A and 35B are formed. Also, one or more gates 36A and 36B for injecting the resin materials are installed on the gripping portion inclined surfaces 35A and 35B.

The gates 36A and 36B are formed of a pin gate or a film gate having a width in a shape of a film. The gates 36A and 36B are in communication with supply pipes 37A and 37B connected to the mold casts 25A and 25B from the outside. The resin materials are supplied from the supply pipes 37A and 37B.

Figure 7:
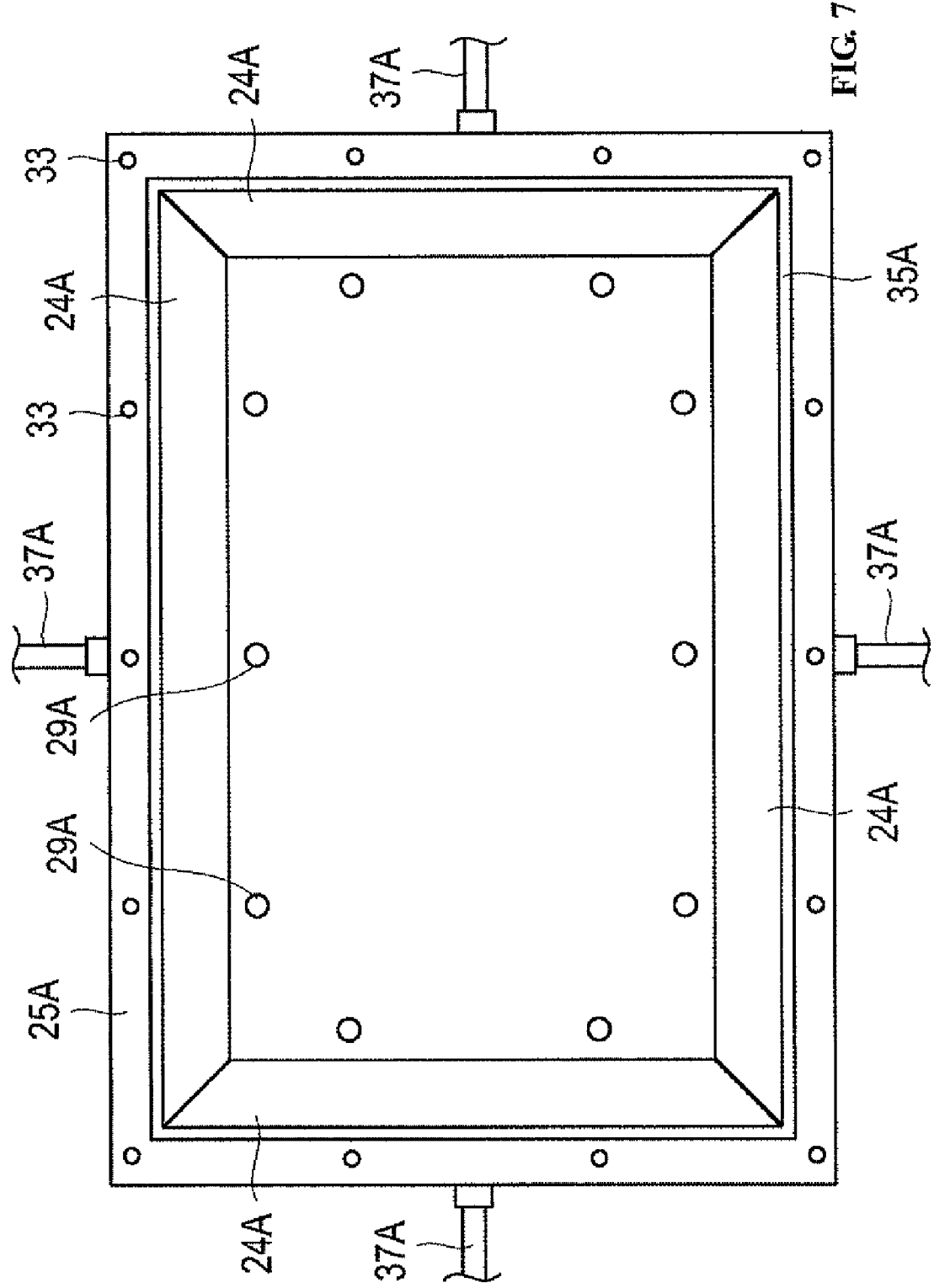
FIG. 7 is a top view of a first mold cast taken along the line VII-VII of FIG. 6.
Figure 8:
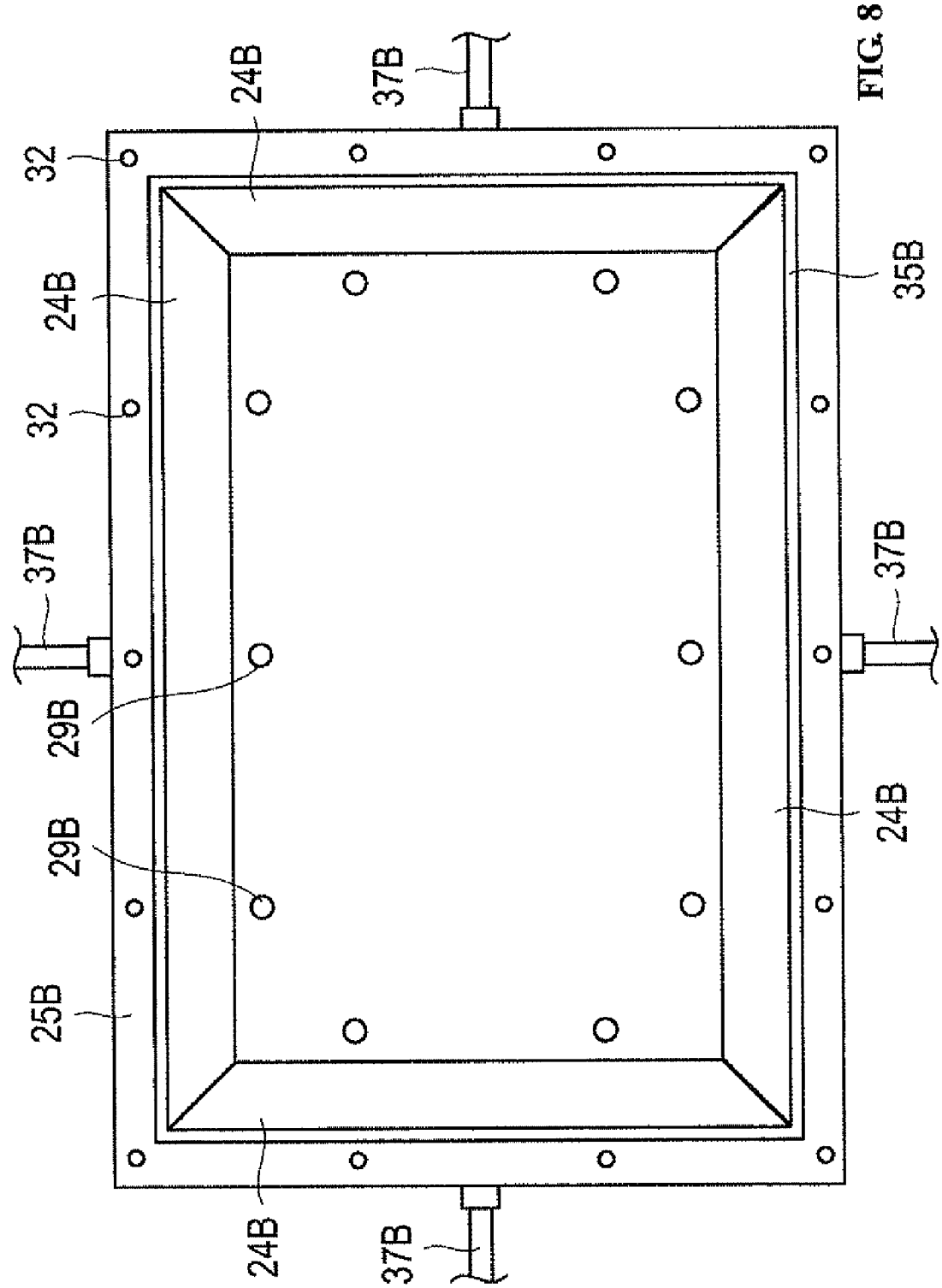
FIG. 8 is a top view of a second mold cast taken along the line VIII-VIII of FIG. 6.

In each opposite surface of the first mold cast 25A and the second mold cast 25B, a first block receiving portion 39A and a second block receiving portion 39B, each in a shape of a recessed groove, are formed along the inner side surfaces of the gripping portions 31A and 31B. The first moveable block 24A is received in the first block receiving portion 39A, while the second moveable block 24B is received in the second block receiving portion 39B. As shown in FIGS. 7 and 8, corresponding to the shapes of the first block receiving portion 39A and the second block receiving portion 39B, the first moveable block 24A and the second moveable block 24B are installed by being divided into four blocks in a circumferential direction. However, the four blocks are provided as a non-limiting example, and the number of divisions is not limited. Further, the blocks need not be divided.

The first moveable block 24A is configured to be forwardly and backwardly moveable toward a direction of the installed pre-assembly 21 by the first driving portion 26A having a servo motor, cylinder, or the like. Further, the second moveable block 24B is also configured to be forwardly and backwardly moveable toward a direction of the installed pre-assembly 21 by the second driving portion 26B having a servo motor, cylinder, or the like. In the first moveable portion 24A and the second moveable portion 24B, a first opposite surface and a second opposite surface opposed to the pre-assembly 21 are formed. Opposite surface inner side portions 41A and 41B in opposite side (inner side) of the gripping portions 31A and 31B of each opposite surface are positioned opposite to outer peripheral ends of the gas diffusion layers 6A and 6B. The forward and backward movements of the first and second moveable blocks 24A and 24B are controlled by the first and second control portions 28A and 28B, respectively.

The first control portion 28A and the second control portion 28B are generally implemented by software stored on, for example, memory of a computer and operated by a central processing unit (CPU).

In the first mold cast 25A, one or more first measuring portions 29A for measuring the thickness of the first catalytic layer 5A and the first gas diffusion layer 6A are installed at a position opposite to the first gas diffusion layer 6A of the pre-assembly 21. The first measuring portion 29A is, for example, a pressure gauge wherein the thicknesses of the first catalytic layer 5A and the first gas diffusion layer 6A are converted from a pressure when contacting the first gas diffusion layer 6A with a predetermined protruding amount. Further, the first measuring portion 29A, for example, may include a displacement gauge. Each first measuring portion 29A is connected to the first control portion 28A, and a measuring signal from the first measuring portion 29A is input to the first control portion 28A. The first control portion 28A calculates an average of the thicknesses of the first catalytic layer 5A and the first gas diffusion layer 6A based on signals from a plurality of the first measuring portions 29A. According to the result of such a measurement, the first moveable block 24A can be forwardly and backwardly moved.

Similarly, in the second mold cast 25B, one or more second measuring portions 29B for measuring the thickness of the second catalytic layer 5B and the second gas diffusion layer 6B are installed at a position opposite to the second gas diffusion layer 6B of the pre-assembly 21. The second measuring portion 29B is, for example, a pressure gauge wherein the thicknesses of the second catalytic layer 5B and the second gas diffusion layer 6B are converted from a pressure when contacting the second gas diffusion layer 6B with a predetermined protruding amount. Further, the second measuring portion 29B, for example, may include a displacement gauge. Each second measuring portion 29B is connected to the second control portion 28B, and a measuring signal from the second measuring portion 29B is input to the second control portion 28B. The second control portion 28B calculates an average of the thicknesses of the second catalytic layer 5B and the second gas diffusion layer 6B based on signals from a plurality of the second measuring portions 29B. According to a result of such a measurement, the second moveable block 24B can be forwardly and backwardly moved.

Next, a manufacturing method of the membrane electrode assembly 1 in accordance with the first embodiment is explained.

Figure 10:
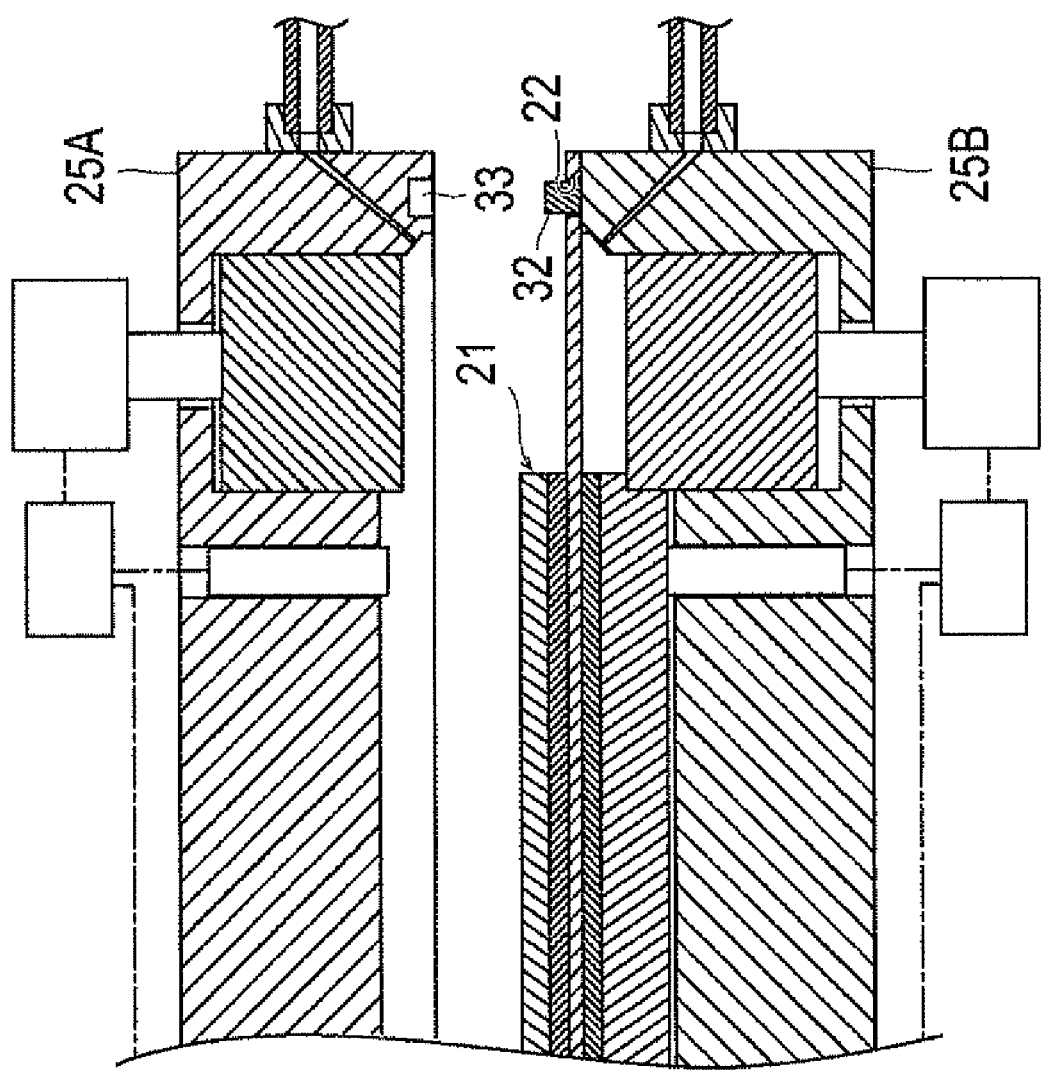
FIG. 10 is a partial cross-sectional view when the pre-assembly is loaded on the manufacturing apparatus in accordance with the first embodiment.

First, as shown in FIG. 10, the pre-assembly 21 is installed in the second mold cast 25B. At this time, the projection 32 of the second mold cast 25B is inserted through the through hole 22 of the pre-assembly 21. As a result, the pre-assembly 21 can be securely retained and supported at the time of the injection molding operation.

Figure 11:
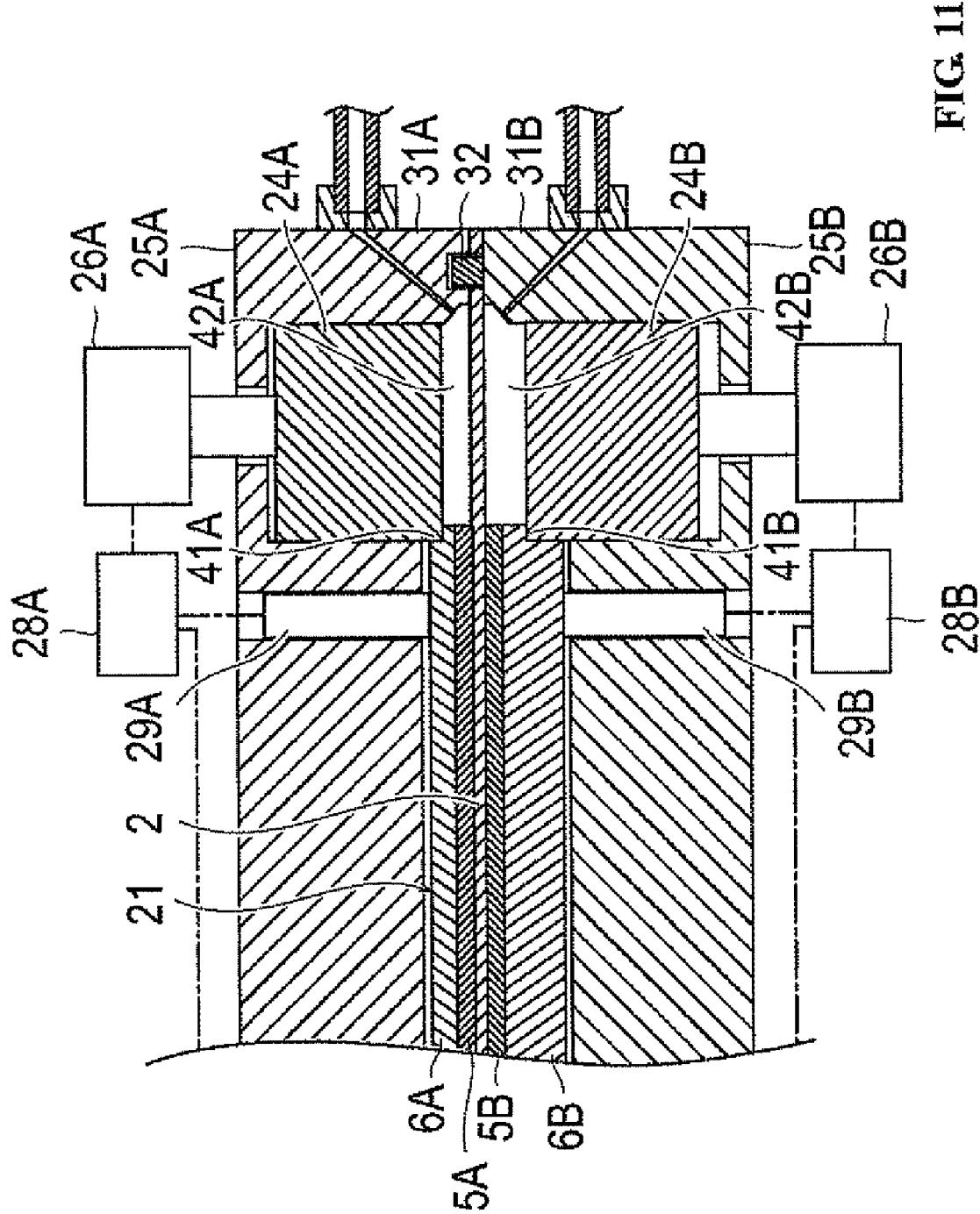
FIG. 11 is a partial cross-sectional view when a mold cast of the manufacturing apparatus is mold-clamped.

Thereafter, as shown in FIG. 11, the first mold cast 25A and the second mold cast 25B are closed by the pressing device, thereby being mold-clamped. By doing so, the electrolyte membrane 2 of the pre-assembly 21 is inserted and gripped between the first gripping portion 31A and the second gripping portion 31B. The projection 32 of the second gripping portion 31B is fitted into the fitting portion 33 of the first gripping portion 31A. Further, as the first moveable block 24A and the second moveable block 24B approach each other, the opposite surface inner side portions 41A and 41B press the first and second gas diffusion layers 6A and 6B. Consequently, a first injection space 42A and a second injection space 42B are formed on an outer side of the gas diffusion layers 6A and 6B and the catalytic layers 5A and 5B of the electrolyte membrane 2.

Next, based on the pressure value from the plurality of the first measuring portions 29A sent to the first control portion 28A, an average of the thicknesses of the first catalytic layer 5A and the first gas diffusion layer 6A is calculated. Then, the first moveable block 24A is forwardly and backwardly moved by controlling the first driving portion 26A by a predetermined amount according to such a calculated result. Here, it is desirable that the pressure value measured by the first measuring portion 29A and the average of the thicknesses of the first catalytic layer 5A and the first gas diffusion layer 6A are stored and calculated by previously measuring a relationship between the pressure value and the thickness by an experiment. Further, instead of measuring the pressure value, the measurement can be performed by using a displacement gauge or laser measuring instrument. However, at this time, it is not necessary to convert the thickness from the pressure by a previous experiment. As described above, since known techniques can be appropriately applied to measure the thickness, the details thereof are omitted herein.

Similar to the above, based on the signal input from the plurality of the second measuring portions 29B to the second control portion 28B, an average of the thicknesses of the second catalytic layer 5B and the second gas diffusion layer 6B is calculated. Then, the second moveable block 24B is forwardly and backwardly moved by controlling the second driving portion 26B by a predetermined amount according to such a calculated result. The thicknesses of the catalytic layers 5A and 5B are very thin, being within a range of 3 to 20 μm, and variation thereof is very small. In contrast, the thicknesses of the gas diffusion layers 6A and 6B are comparatively thick, being within a range of 200 to 600 μm, and variation thereof is large. As such, it is also possible to form the pre-assembly 21 by previously measuring only the thicknesses of the gas diffusion layers 6A and 6B and attaching them to the solid polymer electrolyte membrane 2 and simply adding the approximate thicknesses of the catalytic layers (about 3 to 20 μm or 0 since the value is extremely small). However, operating performance may be deteriorated as this is not as accurate as the present embodiment.

Figure 12:
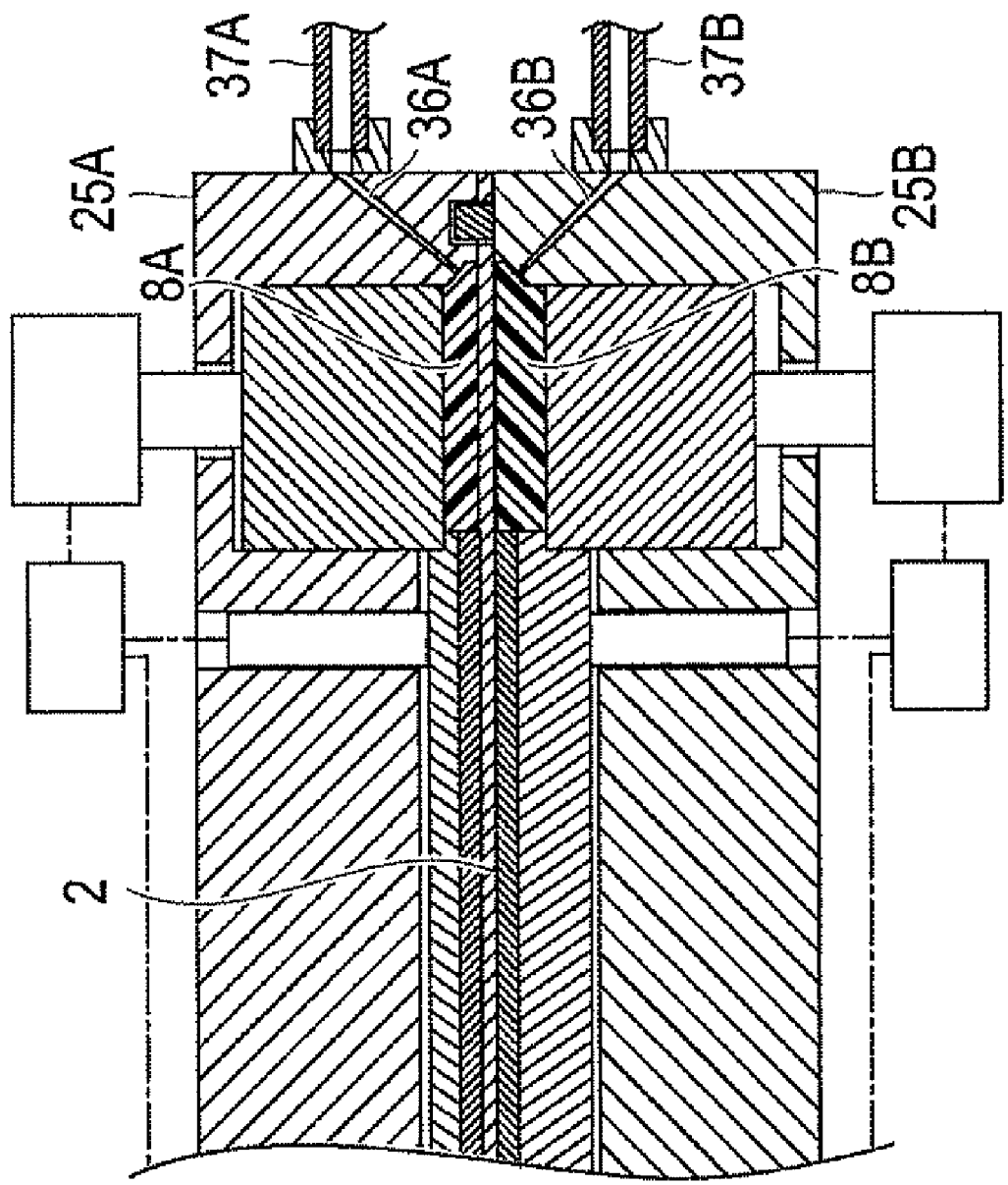
FIG. 12 is a partial cross-sectional view when a resin material is injected into the mold cast of the manufacturing apparatus.

Thereafter, as shown in FIG. 12, the resin materials are injected from the supply pipes 37A and 37B through the gates 36A and 36B to the first injection space 42A and the second injection space 42B.

When the resin material is a thermoplastic resin, the membrane electrode assembly 1 is extracted wherein the first gasket portion 5A and the second gasket portion 8B are molded by releasing the first mold cast 25A and the second mold cast 25B after the resin material is injected in a fused state and the resin material is hardened due to a drop in temperature.

When the resin material is a thermosetting resin, the membrane electrode assembly 1 is extracted wherein the first gasket portion 8A and the second gasket portion 8B are molded by releasing the first mold cast 25A and the second mold cast 25B after the resin material in a liquid phase is injected. The resin material is then hardened by heating at a temperature higher than a hardening temperature by a heater (not shown) installed in the first mold cast 25A and the second mold cast 25B.

According to the membrane electrode assembly 1 manufactured as above, since the resin material is injected from the inclined surfaces 10A and 10B, resin remaining in the gates 36A and 36B and protruding in an outer peripheral direction after the gates are removed can be prevented from contacting the separator 9. Further, adhesion with the separator 9 can be favorably maintained when constituting the fuel cell.

According to the thicknesses of the catalytic layer 5A and the gas diffusion layer 6A, as well as the catalytic layer 5B and the gas diffusion layer 6B, since each moveable block 24A and 25B is moved, the catalytic layers 5A and 5B and the gasket portions 8A and 8B can be molded to have optimum thicknesses corresponding to the gas diffusion layers 6A and 6B.

Such an optimum thickness is, for example, established such that the thicknesses H1 and H2 of the gaskets are respectively determined as 80% of the thicknesses of the catalytic layer 5A and the gas diffusion layer 6A and the thicknesses of the catalytic layer 5B and the gas diffusion layer 6B. Further, such a ratio can be appropriately varied according to the types of the gas diffusion layers.

Also, at the time of the injection-molding operation, since the moveable blocks 24A and 24B are contacted while compressing the gas diffusion layers 6A and 6B, the resin materials can be restrained from penetrating into the gas diffusion layers 6A and 6B. Moreover, the deterioration of the gas diffusing performance of the gas diffusion layers 6A and 6B and the drainage performance can be restrained.

Further, the thicknesses H1 and H2 of the gasket portions 8A and 8B can be established by measuring the thicknesses of the catalytic layer 5A and the gas diffusion layer 6A, as well as the catalytic layer 5B and the gas diffusion layer 6B, by the measuring portions 29A and 29B, even when the thicknesses of the gas diffusion layers 6A and 6B are changed. Thus, it is possible to maintain the step heights H3 and H4 with the optimum value. In addition, the deterioration of the power generating efficiency of the fuel cell can be suppressed by restraining the deterioration of the gas diffusing performance and the drainage performance of the gas diffusion layers 6A and 6B.

Because the step heights H3 and H4 can be established separately, even when the materials of an anode side and a cathode side of the gas diffusion layers 6A and 6B are different, each side can be maintained with the optimum step heights H3 and H4.

The gasket portions 8A and 8B can be integrally molded with an optimum size, making it unnecessary to have various types of gaskets prepared, thereby reducing costs.

According to the membrane electrode assembly 1 of this embodiment, since the gasket portions 8A and 8B are integrally molded, the number of components can be reduced, and position precision can be improved. Further, when the gasket is installed as a separate member, there may be a concern that bubbles or impurities are intermixed between the gasket and the electrolyte membrane. However, according to the manufacturing method disclosed herein, the likelihood of intermixing a bubble or impurities is very low. Because it is not necessary to bond the gasket as a separate member when assembling the fuel cell, the number of operations can be reduced.

A manufacturing apparatus 50 of a membrane electrode assembly and a manufacturing method in accordance with a second embodiment differ from the manufacturing apparatus 20 and the manufacturing method in accordance with the first embodiment. Specifically, the gasket portions 8A and 8B are compression-molded in the second embodiment, whereas the gasket portions 8A and 8B are injection-molded or injection thermal compression-molded in the first embodiment. Further, the membrane electrode assembly 1 manufactured in the second embodiment has the same structure of the membrane electrode assembly 1 in the first embodiment.

As to the portions having the same functions as in the first embodiment, same reference numerals are denoted and explanations thereof are omitted in order to avoid repetition.

The manufacturing apparatus 50 of the membrane electrode assembly in accordance with the second embodiment comprises an apparatus for installing the pre-assembly 21 as in FIGS. 4 and 5, which forms the catalytic layers 5A and 5B and the gas diffusion layers 6A and 6B on both surfaces of the electrolyte membrane 2. The apparatus also integrally compression-molds the gasket portions 8A and 8B on the electrolyte membrane 2.

Figure 13:
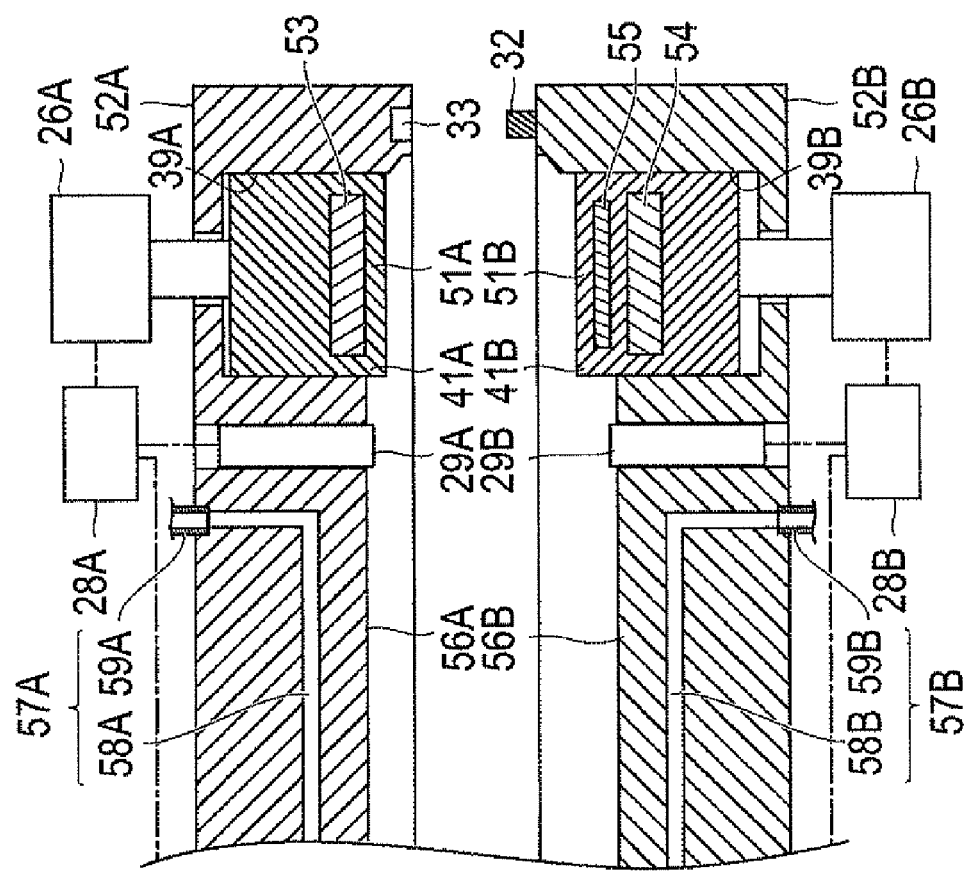
FIG. 13 is a partial cross-sectional view of a manufacturing apparatus of a membrane electrode assembly in accordance with a second embodiment.

As shown in FIG. 13, the manufacturing apparatus 50 comprises a pair of a first mold cast 52A and a second mold cast 52B, respectively including a first moveable block 51A and a second moveable block 51B therein.

The first moveable block 51A comprises a first heating portion 53, which is used to heat the first moveable block 51A. The first heating portion 53 has is elongated along a length direction of the first moveable block 51A. A heat transfer heater unit is preferable used for the first heating portion 53 in the present embodiment, although other structures (e.g., a structure of using a high frequency heater or leaking a high temperature fluid) may be applied. Further, since the heat transfer heater unit is a known device, the detailed explanations thereof is omitted herein. The first heating portion 53 is connected to an external power source unit (not shown), and a temperature of the first heating portion 53 can be arbitrarily established by controlling the power source unit.

The second moveable block 51B comprises a second heating portion 54 for heating the second moveable block 51B and a block cooling portion 55 for cooling the second moveable block 51B. The second heating portion 54 is elongated along a length direction of the second moveable block 51B. A high frequency heater unit capable of rapid heating is preferable as the second heating portion 54 in the present embodiment although other structures (e.g., a structure of using a heat transfer heater or leaking a high temperature fluid) may be applied. Further, since the high frequency heater unit is a known device, the detailed explanations thereof are omitted herein. The second heating portion 54 is connected to an external power source unit (not shown), and a temperature of the second heating portion 54 can be arbitrarily established by controlling the power source unit.

The block cooling portion 55 is elongated along a length direction of the second moveable block 51B. A Peltier system cooling element is preferable for the block cooling portion 55 in the present embodiment, although other structures (e.g., a structure of leaking a low temperature fluid) may be applied. The block cooling portion 55 is connected to an external power source unit (not shown), and a temperature of the block cooling portion 55 can be arbitrarily established by controlling the power source unit.

In a first center portion 56A of the first mold cast 52A surrounded by the first moveable block 51A, a first mold cast cooling portion 57A is installed. Further, in a second center portion 56B of the second mold cast 52B surrounded by the second moveable block 52B, a second mold cast cooling portion 57B is installed.

The first mold cast cooling portion 57A and the second mold cast cooling portion 57B comprise a first cooling flow path 58A and a second cooling flow path 58B, respectively. A cooling medium (e.g., coolant water) can be supplied from an external cooling fluid supply source (not shown) via cooling fluid supply pipes 59A and 59B to the first cooling flow path 58A and the second cooling flow path 58B. The first cooling flow path 58A is formed as a plurality of flow paths along a length direction of each first moveable block 51A so as to surround four sides of the first center portion 56A. The second cooling flow path 58B is also formed as a plurality of flow paths along a length direction of each second moveable block 51B so as to surround four sides of the second center portion 56B. Shapes of the flow paths are not specifically limited but may include a formation of a single path rather than a plurality of paths bent in a rectangular shape along length directions of the first and second moveable block 51A and 51B.

Next, a manufacturing method of the membrane electrode assembly in accordance with the second embodiment is explained.

First, the first center portion 56A and the second center portion 56B of the first mold cast 52A and the second mold cast 52B are cooled by supplying the cooling medium from the cooling fluid supply source to the first and second cooling flow paths 58A and 58B. Simultaneously, the first moveable block 51A is heated by operating the first heating portion 53. Heating of the first moveable block 51A while cooling the first center portion 56A and the second center portion 5613 is maintained all the time during a processing cycle.

Then, the second moveable block 51B is cooled by operating the block cooling portion 55.

Figure 14:
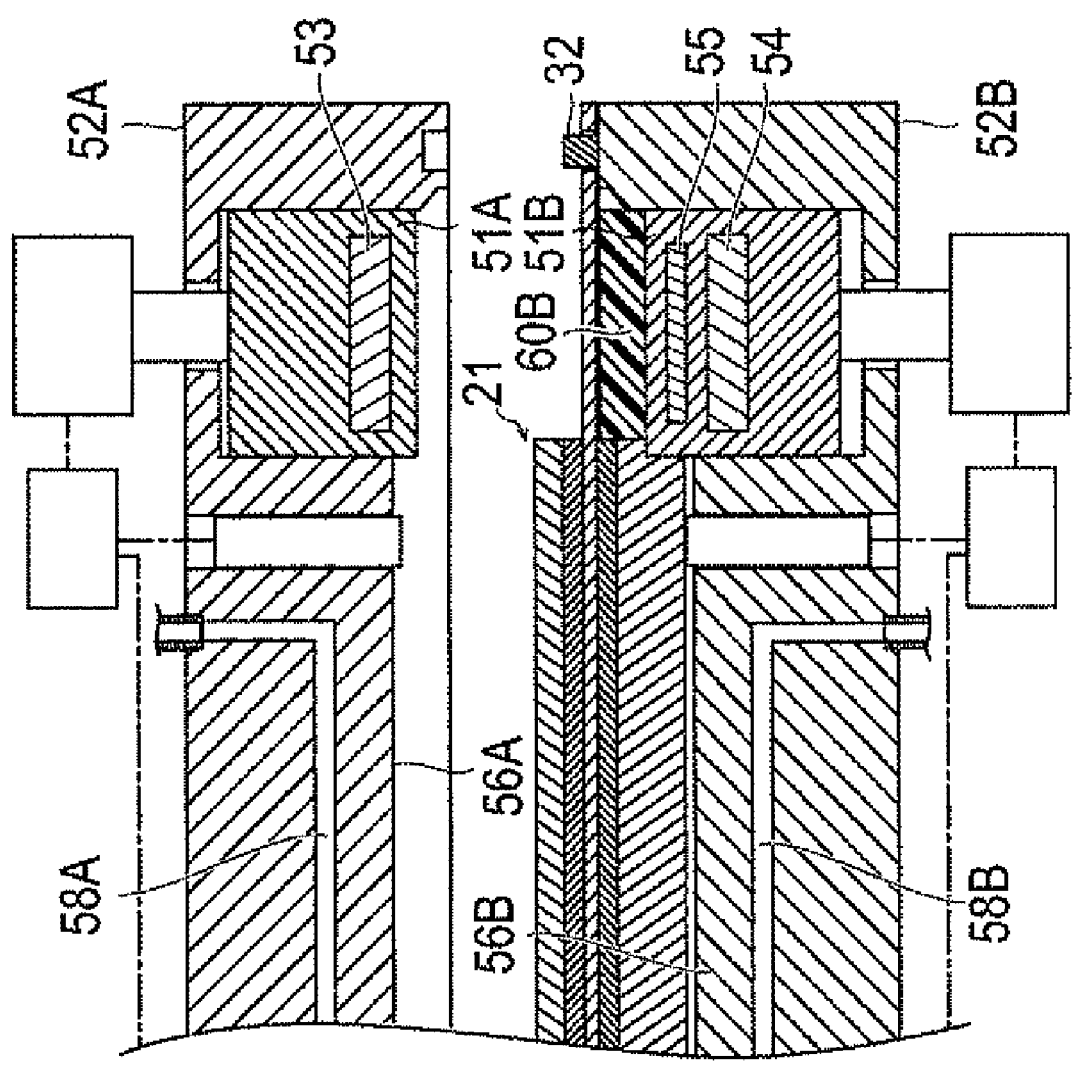
FIG. 14 is a partial cross-sectional view when a part of filling materials and the pre-assembly are loaded on the manufacturing apparatus in accordance with the second embodiment.
Figure 15:
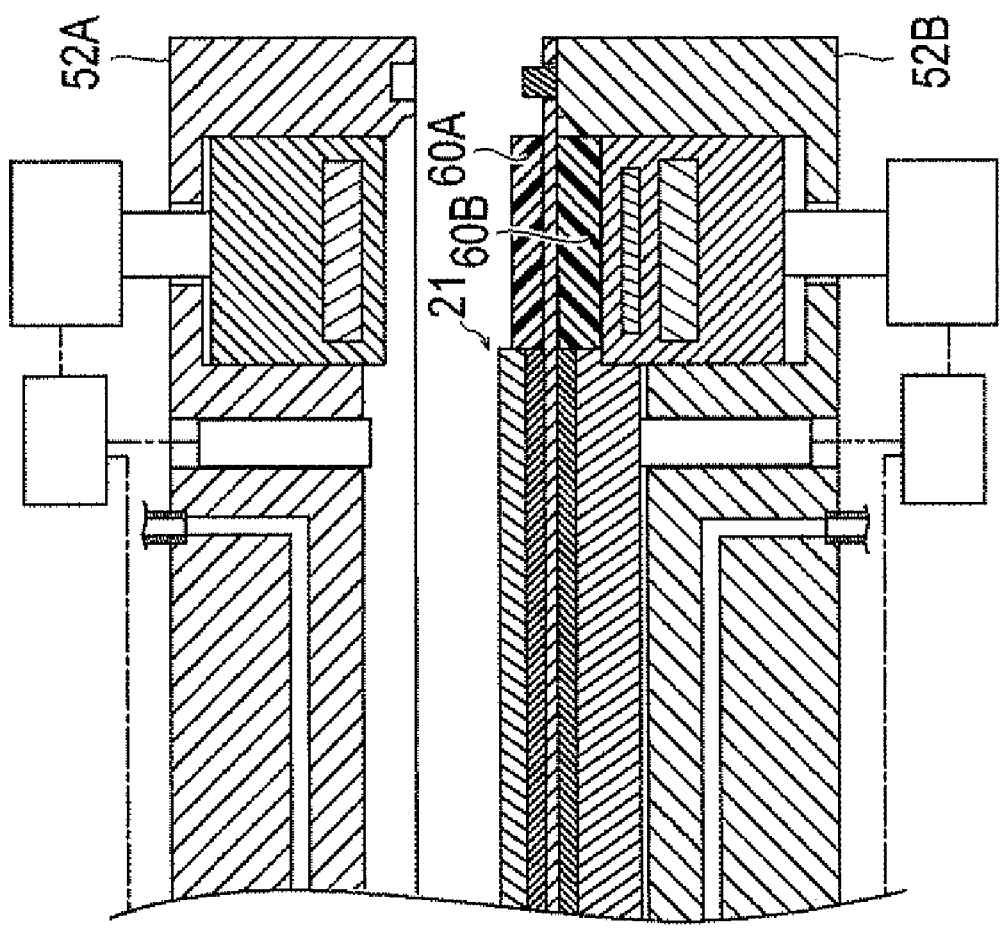
FIG. 15 is a partial cross-sectional view just before mold-clamping the mold cast of the manufacturing apparatus.

Next, as shown in FIG. 14, a second resin filling material 60B is loaded on the second moveable block 51B of the second mold cast 52B. Then, the pre-assembly 21 is installed on the second mold cast 52B. At this time, since the projection 32 of the second mold cast 52B is inserted through the through-hole 22 of the pre-assembly 21, the pre-assembly 21 can be securely retained and supported at the time of a compression-molding operation, which is explained below. Thereafter, as shown in FIG. 15, a first resin filling material 60A is loaded on a position corresponding to the first moveable block 51A of the pre-assembly 21.

The first and second filling materials 60A and 60B described above are materials in the shape of a sheet mainly consisting of thermosetting resins. For example, such materials can be input in any position by suctioning with a suction pad in the shape of a sponge. Further, the first and second filling materials 60A and 60B may include a powder material, a semi-hardened material obtained by pre-heating the powder material or a gel material (i.e., slurry material). In the case of the powder or gel, the first and second filling materials 60A and 60B can be injected on any position by being discharged from a nozzle. Also, the first and second filling materials 60A and 60B are formed in an annular shape surrounding an outer periphery of the gas diffusion layers 6A and 61B, although the first and second filling materials 60A and 60B may be installed by being divided into a plurality of pieces.

Figure 16:
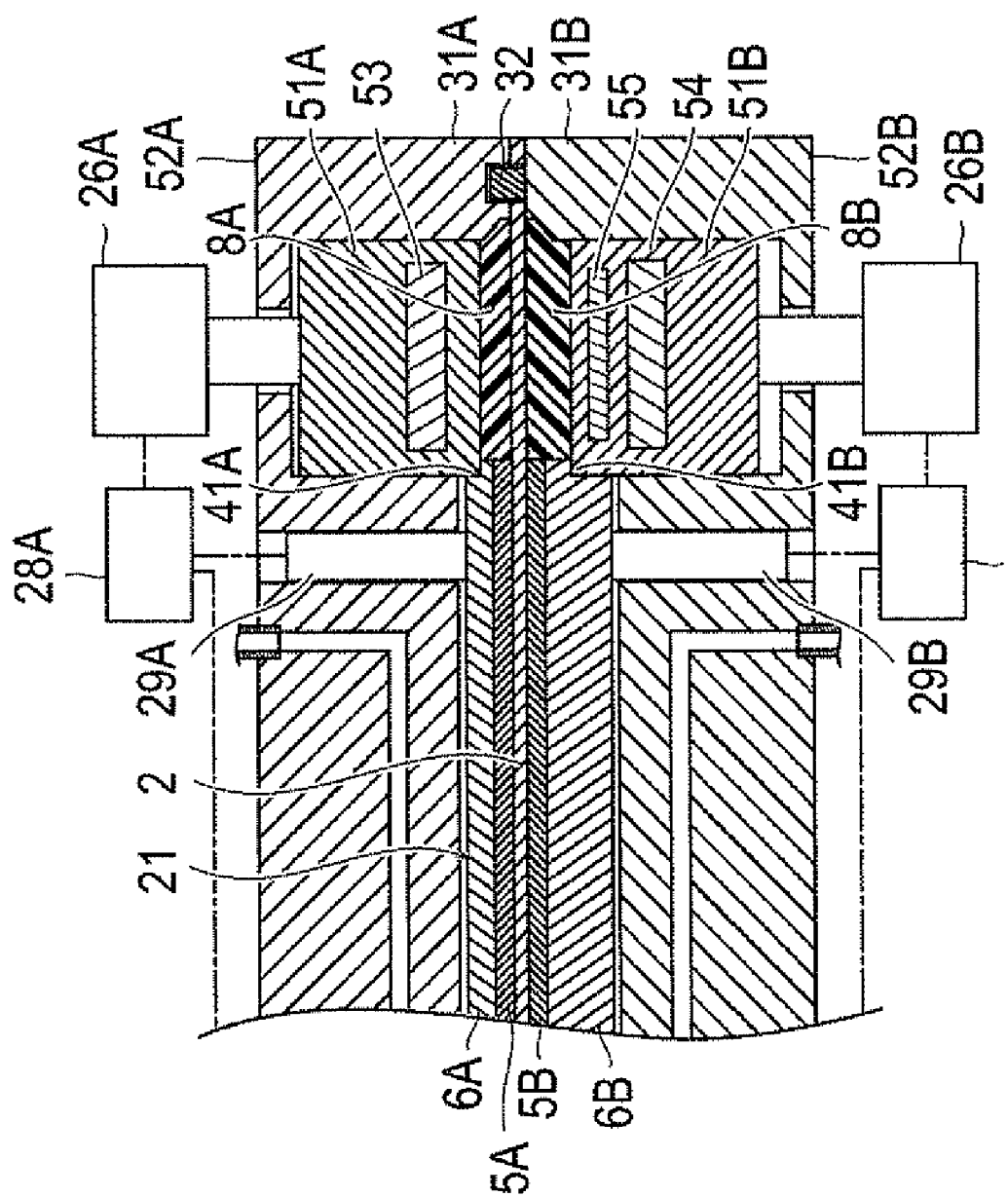
FIG. 16 is a partial cross-sectional view when the mold cast of the manufacturing apparatus is mold-clamped, thereby being compression-molded.
Figure 17:
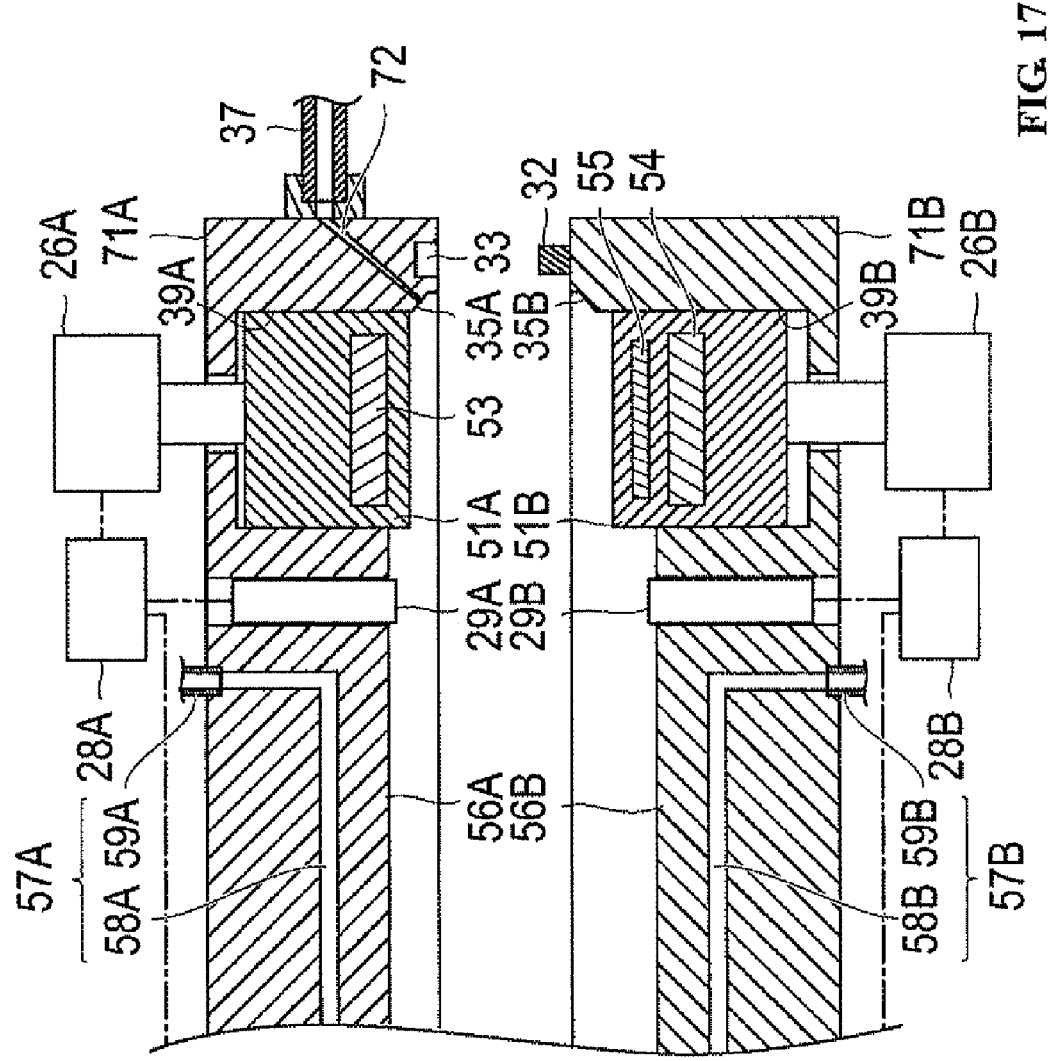
FIG. 17 is a partial cross-sectional view of a manufacturing apparatus of a membrane electrode assembly in accordance with a third embodiment.

Thereafter, as shown in FIG. 16, the first mold east 52A and the second mold cast 52B are closed by the pressing means to thereby become mold-clamped, while being rapidly heated by stopping operation of the block cooling portion 55 of the second moveable block 51B and operating the second heating portion 54. At this time, the electrolyte membrane 2 of the pre-assembly 21 is inserted and gripped between the first gripping portion 31A and the second gripping portion 31B. Further, the projection 32 of the second gripping portion 31B is fitted in the fitting portion 33 of the first gripping portion 31A. Also, the first moveable block 51A and the second moveable block 51B are pressed toward each other so that the opposite surface inner side portions 41A and 41B press the first and second gas diffusion layers 6A and 6B.

The first and second filling materials 60A and 60B are fused by the first moveable block 51A and the second moveable block 51B heated by the first heating portion 53 and the second heating portion 54. While the first and second filling materials 60A and 60B are in a fused state, an average value of the thicknesses of the first catalytic layer 5A and the first gas diffusion layer 6A is calculated by a plurality of the first measuring portions 29A. Based on a predetermined amount according to the calculated average value of the thicknesses of the first catalytic layer 5A and the first gas diffusion layer 6A, the first moveable block 51A is forwardly and backwardly moved by controlling the first driving portion 26A.

Likewise, while the first and second filling materials 60A and 60B are in a fused state, an average value of the thicknesses of the second catalytic layer 5B and the second gas diffusion layer 6B is calculated by a plurality of the second measuring portions 29B. Based on a predetermined amount according to such a calculated result, the second moveable block 51B is forwardly and backwardly moved by controlling the second driving portion 26B.

Thereafter, until the first and second filling materials 60A and GOB are hardened, the positions and heating temperatures of the first and second moveable blocks 51A and 51B are maintained. At a point of time when a hardening reaction is ended until the shapes of the first and second filling materials can be maintained despite being released, the first mold cast 52A and the second mold cast 52B are released. By doing so, the membrane electrode assembly 1 wherein the first gasket portion 8A and the second gasket portion 8B are molded is extracted.

Next, the heating is ended by stopping the operation of the second heating portion 54. The second moveable block 51B is cooled by operating the block cooling portion 55. After a temperature of the second moveable block 51B is decreased to a predetermined temperature, the manufacturing of the membrane electrode assembly 1 below is started.

As in the above manufacturing apparatus 50 and the manufacturing method in accordance with the second embodiment, despite using the compression-molding operation and not the injection-molding or injection thermal compression-molding operation, the gasket portions 8A and 8B can be molded to have an optimum thickness corresponding to the thicknesses of the catalytic layer 5A and the gas diffusion layer 6A, as well as the catalytic layer 5B and the gas diffusion layer 6B as in the first embodiment.

Further, as an effect differing from the first embodiment, since the first and second mold cast cooling portions 57A and 57B are installed in the first and second center portion 56A and 56B adjacent or adhered to the gas diffusion layers 6A and 6B of the pre-assembly 21, a region of the pre-assembly 21 can be protected from an excessive temperature increase, as it is not required to be heated.

Moreover, since the second filling material 60B is arranged under the pre-assembly 21 before the first mold cast 52A and the second mold cast 52B are mold-clamped, a downward suspension of the pre-assembly 21 is prevented by the second filling material 60B. The pre-assembly 21 can be retained and supported at a more appropriate position.

Also, since the first and second heating portions 53 and 54 are installed in the first and second moveable blocks 51A and 51B, a region required to be heated can be intensively heated.

Further, since the block cooling portion 55 is installed in the second moveable block 51B, the second moveable block 51B wherein the second filling material 60B is arranged can be intensively cooled. Thus, when the membrane electrode assembly 1 is sequentially manufactured, since the second moveable block 51B can be cooled in a short time, the working hours can be reduced.

Also, the first and second mold cast cooling portions 57A and 57B, the first and second heating portions 53 and 54 and the block cooling portion 55 of the manufacturing apparatus 50, which are in accordance with the second embodiment, are applicable to the first embodiment.

A manufacturing apparatus 70 of a membrane electrode assembly and a manufacturing method in accordance with a third embodiment differ from the manufacturing apparatuses 20 and 50 and manufacturing methods in accordance with the first and second embodiments since the gasket portion 8A at one side is injection-molded or injection thermal compression-molded while the gasket portion 8A at the other side is compression-molded. Further, the membrane electrode assembly 1 in the third embodiment has the same structure as the membrane electrode assembly 1 in the first and second embodiments. As to the portions having the same functions as in the first embodiment, same reference numerals are denoted, and the explanations thereof are omitted herein in order to avoid repetition.

The manufacturing apparatus 70 of the membrane electrode assembly in accordance with the third embodiment comprises an apparatus for installing the pre-assembly 21 as seen in FIGS. 4 and 5, which forms the catalytic layers 5A and 5B and the gas diffusion layers 6A and 6B on both surfaces of the electrolyte membrane 2, and for injection molding or injection thermal compression-molding the gasket portion 8A at one side and compression-molding the gasket portion 8B at the other side of the electrolyte membrane 2.

Such a manufacturing apparatus 70 of the membrane electrode assembly is the same as the manufacturing apparatus 50 in accordance with the second embodiment, except that a gate 72 is formed on a first mold cast 71A, and a supply pipe 73 for supplying a resin material is connected to the gate 72. Similar to the gate 36A in the first embodiment, the gate 72 is formed of a pin gate or a film gate having a width in the shape of a film.

Next, a manufacturing method of the membrane electrode assembly in accordance with the third embodiment is explained below.

First, the first center portion 56A and the second center portion 56B of the first mold cast 71A and the second mold cast 71B are cooled by supplying the cooling medium from the cooling fluid supply source to the first and second cooling flow paths 58A and 58l3. Simultaneously, the first moveable block 51A is heated by operating the first heating portion 53. Heating the first moveable block 51A while cooling the first center portion 56A and the second center portion 56B are maintained all the time during a processing cycle. Then, the second moveable block 51B is cooled by operating the block cooling portion 55.

Figure 18:
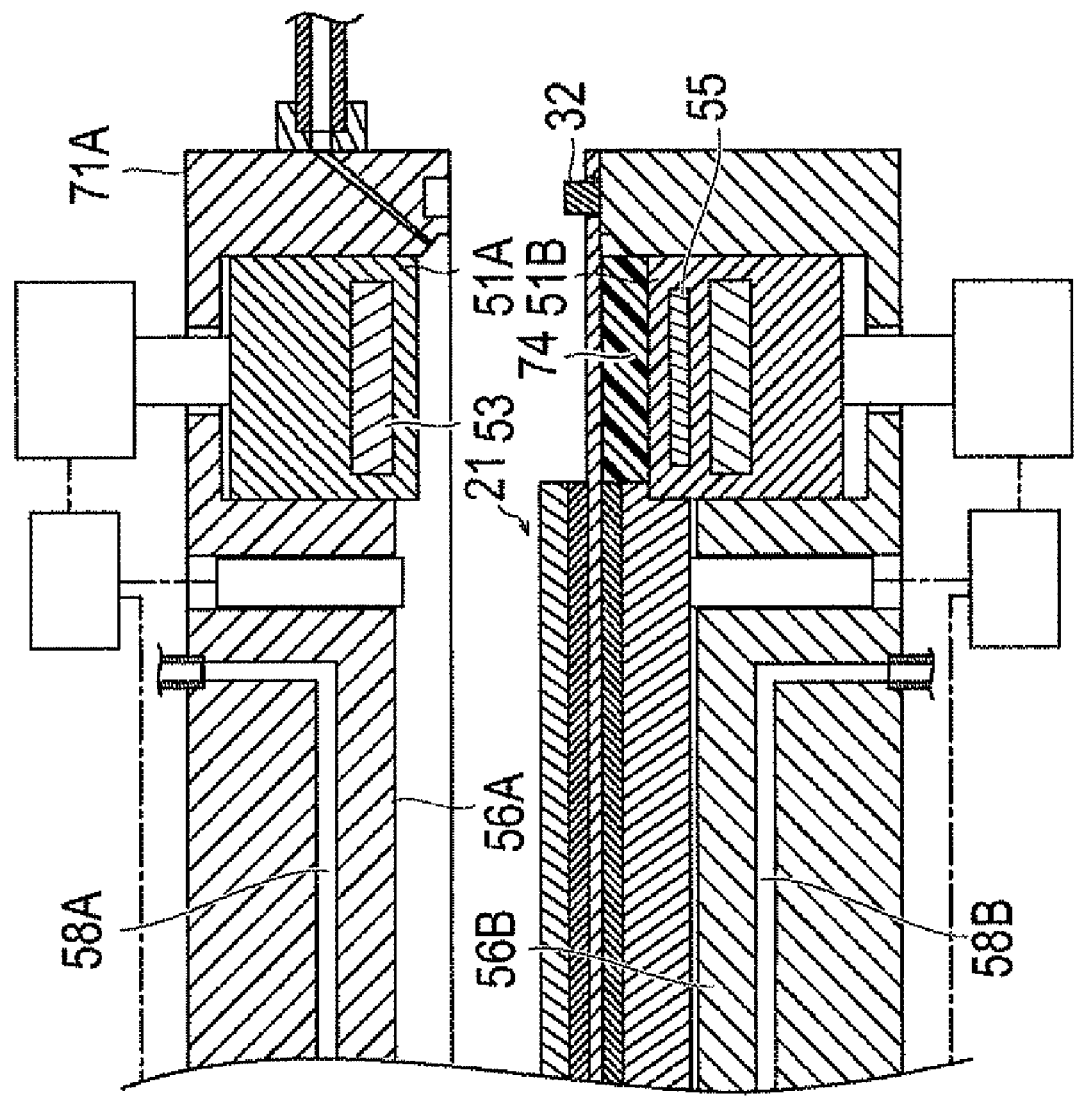
FIG. 18 is a partial cross-sectional view when a part of filling materials and the pre-assembly are loaded on the manufacturing apparatus in accordance with the third embodiment.

Next, as shown in FIG. 18, a second resin filling material 74 is loaded on the second moveable block 51B of the second mold cast 71B. Then, the pre-assembly 21 is installed on the second mold cast 71B. At this time, since the projection 32 of the second mold cast 71B is inserted through the through-hole 22 of the pre-assembly 21, the pre-assembly 21 can be securely retained and supported at the time of a compression-molding operation, as explained below.

The second filling material 74 described above is a material in the shape of a sheet mainly consisting of thermosetting resins as in the second embodiment. For example, such a material can be injected in any position by suctioning with a suction pad in the shape of a sponge. Further, the second filling material 74 may include a powder material, a semi-hardened material obtained by pre-heating the powder material or a gel material (i.e., slurry material). In the case of the powder or gel, the second filling material 74 can be input at an arbitrary position by being discharged from a nozzle. Also, the second filling material 74 is formed in an annular shape surrounding an outer periphery of the gas diffusion layer 6B, although the second filling material 74 may be installed by being divided into a plurality of pieces.

Figure 19:
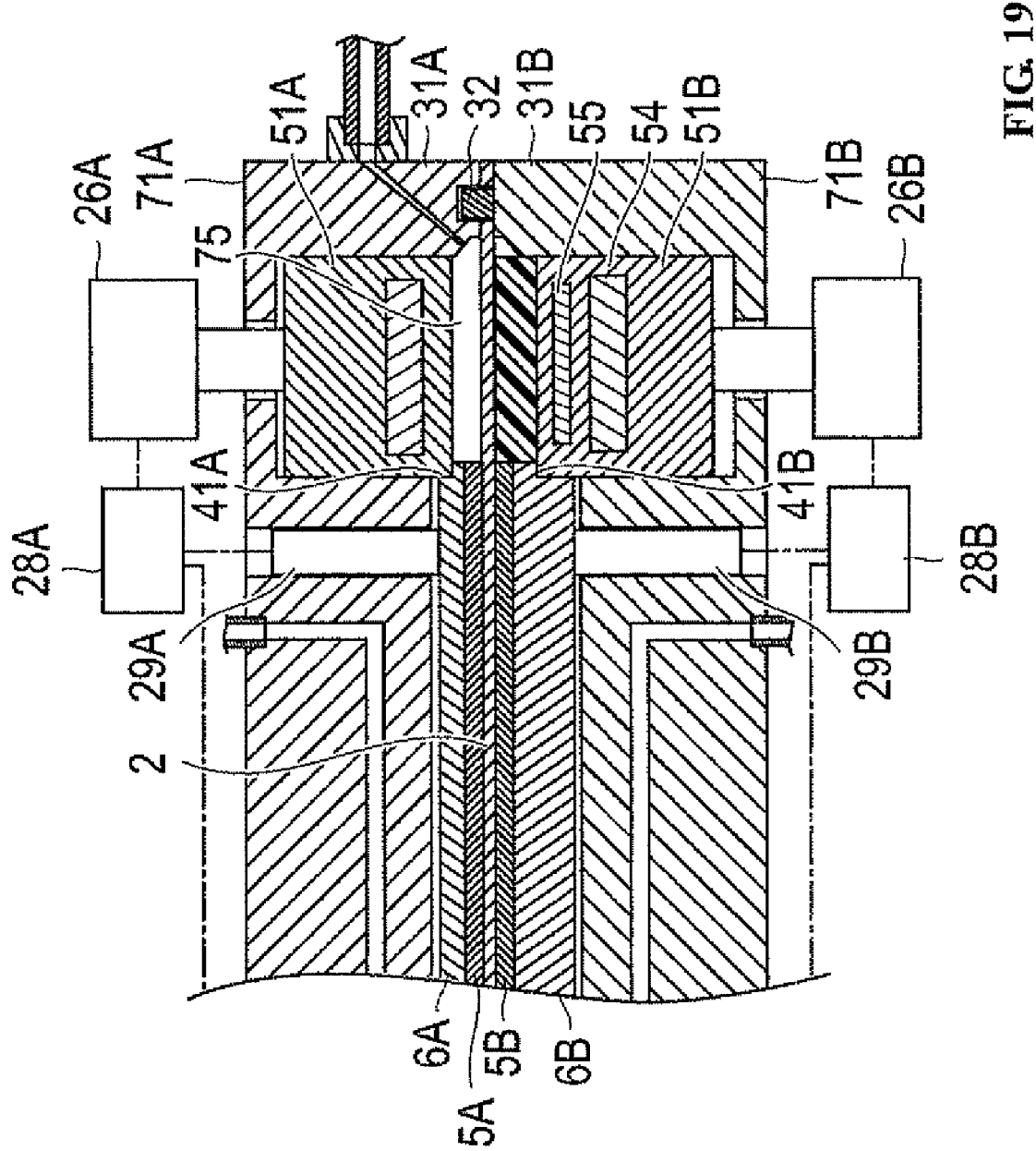
FIG. 19 is a partial cross-sectional view when the mold cast of the manufacturing apparatus is mold-clamped.

Thereafter, as shown in FIG. 19, the first mold cast 71A and the second mold cast 71B are closed by the pressing device to thereby become mold-clamped, while being rapidly heated by stopping operation of the block cooling portion 55 of the second moveable block 51B and operating the second heating portion 54. At this time, the electrolyte membrane 2 of the pre-assembly 21 is inserted and gripped between the first gripping portion 31A and the second gripping portion 31B. Further, the projection 32 of the second gripping portion 31B is fitted in the fitting portion 33 of the first gripping portion 31A. The first moveable block 51A and the second moveable block 51B are in contact so that the opposite surface inner side portions 41A and 41B press the first and second gas diffusion layers 6A and 6B. As a result, a first injection space 75 is formed at outer sides of the gas diffusion layer 6A and the catalytic layer 5A of the electrolyte membrane 2.

The second filling material 74 is fused by the second moveable block 51B heated by the second heating portion 54. While the second filling material 74 is in a fused state, an average value of the thicknesses of the first catalytic layer 5A and the first gas diffusion layer 6A is calculated by a plurality of the first measuring portions 29A. Based on a predetermined amount according to the calculated result, the first moveable block 51A is forwardly and backwardly moved by controlling the first driving portion 26A.

Likewise, while the first and second filling materials 60A and 60B are in a fused state, an average value of the thicknesses of the second catalytic layer 5B and the second gas diffusion layer 6B is calculated by a plurality of the second measuring portions 29B. Based on a predetermined amount according to such a calculated result, the second moveable block 51B is forwardly and backwardly moved by controlling the second driving portion 26B.

Thereafter, as shown in FIG. 20, the resin material is injected from the supply pipe 73 through the gate 72 to the first injection space 75. Also, it is desirable if the same material as the second filling material 74 is used for the resin material, although the invention is not limited to such a configuration.

Until the second filling material 74 and the injected resin material are hardened, the positions and temperatures of the first and second moveable blocks 51A and 51B are maintained. Also, when a hardening reaction is ended, meaning the shapes of the second filling material 74 and the resin material can be maintained despite being released, the first mold cast 71A and the second mold cast 71B are released. By doing so, the membrane electrode assembly 1 with the molded first gasket portion 8A and the second gasket portion 8B is extracted. Thereafter, the heating is ended by stopping the operation of the second heating portion 54.

Then, the second moveable block 51B is cooled by operating the block cooling portion 55. After a temperature of the second moveable block 51B is decreased to a predetermined temperature, the manufacturing of the membrane electrode assembly 1 is started.

As in the above manufacturing apparatus 70 and the manufacturing method in accordance with the third embodiment, even when using a mixture of the compression-molding operation with the injection molding operation or the injection thermal compression-molding operation, the gasket portions 8A and 8B can be molded to have an optimum thickness corresponding to the thicknesses of the catalytic layer 5A and the gas diffusion layer 6A, as well as the catalytic layer 5 and the gas diffusion layer 6B, as in the first and second embodiments.

While certain embodiments of the invention are described above, the invention may include other embodiments and modifications without deviating from the subject matter or scope of the present invention and may be varied in the range of the claims. For example, the projection 32 may be formed on the first mold cast 25A. Further, as long as the pre-assembly 21 can be retained and supported at the time of the injection-molding operation, the projection is not necessarily formed.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A manufacturing apparatus for use with a membrane electrode assembly having both a catalytic layer and a gas diffusion layer on opposing surfaces of an electrolyte membrane, the apparatus comprising:
    a mold cast including a gripping portion configured to grip an edge portion of the catalytic and the gas diffusion layers;
    a measuring portion configured to measure thicknesses of the catalytic layer and the gas diffusion layer and to produce a measurement output;
    a moveable block positioned proximate to the gripping portion, the moveable block operable to move forward and backward against the electrolyte membrane along an inner side surface of the gripping portion, the moveable block having a side opposite the gripping portion and adjacent to an outer peripheral end of the gas diffusion layer; and
    a control portion configured to receive measurement output from the measuring portion and to control the forward-backward movement of the moveable block according to the thicknesses of the catalytic layer and the gas diffusion layer.

2. The manufacturing apparatus according to claim 1 wherein the gripping portion has an inclined surface interposed between the gripping portion and the moveable block, the apparatus further comprising:
    a gate through which a resin material is injected, the gate positioned at the inclined surface of the gripping portion.

3. The manufacturing apparatus according to claim 2 wherein the gate is a pin gate or a film gate.

4. The manufacturing apparatus according to claim 1 wherein the moveable block has a heating portion configured to heat the moveable block.

5. The manufacturing apparatus according to claim 4 wherein the moveable block has a block cooling portion configured to cool the moveable block.

6. The manufacturing apparatus according to claim 1 wherein the moveable block has a block cooling portion configured to cool the moveable block.

7. The manufacturing apparatus according to claim 1 wherein the mold cast has a mold cast cooling portion configured to cool a region of the mold cast adjacent to the gas diffusion layer.

8. The manufacturing apparatus according to claim 1 wherein the mold cast forms a molding space for the resin material sufficient for a thickness of the resin material to be less than a total thickness of the catalytic layer and the gas diffusion layer; and wherein the control portion is configured to control the forward-backward movement of the moveable block until the total thickness of the catalytic layer and the gas diffusion layer is approximately equal to the thickness of the gasket portion resin material.

9. A method of manufacturing a membrane electrode assembly having both a catalytic layer and a gas diffusion layer on opposing surfaces of an electrolyte membrane using the apparatus of claim 1, comprising:
    measuring the thicknesses of the catalytic layer and the gas diffusion layer using the measuring portion;
    determining a thickness of a gasket portion according to the thicknesses of the catalytic layer and the gas diffusion layer;
    molding the gasket portion having the determined thickness around at least a portion of the catalytic layer and the gas diffusion layer while gripping the edge portion of the catalytic and the gas diffusion layers with the gripping portion of the mold cast;
    moving the moveable block forward and backward against the electrolyte membrane along an inner side surface of the gripping portion, the moveable block having the side opposite the gripping portion and adjacent to the outer peripheral end of the gas diffusion layer; and controlling the forward-backward movement of the moveable block using the control portion according to the thicknesses of the catalytic layer and the gas diffusion layer.

10. The method according to claim 9 wherein controlling the forward-backward movement of the moveable block comprises:
    compressing the catalytic layer and the gas diffusion layer by moving the moveable block until a total thickness of the catalytic layer and the gas diffusion layer is approximately equal to the determined thickness of the gasket portion.

11. The method according to claim 10 wherein the membrane electrode assembly further has a separator on one or both opposing surfaces and wherein the catalytic layer and the gas diffusion layer are compressed with the separator.

12. The method according to claim 9 wherein the gasket portion is a resin material.

13. The method according to claim 12 wherein the gasket portion is molded by injection-molding or injection compression-molding.

14. The method according to claim 13 wherein molding the gasket portion comprises:
    injecting the resin material into a molding space of the mold cast through a gate in the mold cast, wherein an inclined surface is formed in the gripping portion at an outer peripheral edge portion of the gasket portion at a region of the gate.

15. The method according to claim 14 wherein the gate is a pin gate or a film gate.

16. The method according to claim 9 wherein the gasket portion is molded by injection-molding or injection compression-molding.

17. The method according to claim 9 wherein molding the gasket portion comprises:
    injecting a resin material into a molding space of the mold cast through a gate in the mold cast, wherein an inclined surface is formed in the gripping portion at an outer peripheral edge portion of the gasket portion at a region of the gate.

18. The method according to claim 17 wherein the gate is a pin gate or a film gate.

19. The method according to claim 9 wherein the gasket portion is molded by compression-molding.

20. The method according to claim 9 wherein the determined thickness of the gasket portion is less than a total thickness of the catalytic and the gas diffusion layers after molding the gasket portion and before moving the moveable block; and wherein controlling the forward-backward movement of the moveable block comprises compressing the catalytic layer and the gas diffusion layer by moving the moveable block until the total thickness of the catalytic layer and the gas diffusion layer is approximately equal to the determined thickness of the gasket portion.

* * * * *